United States Patent
Yonezawa et al.

(10) Patent No.: US 6,513,146 B1
(45) Date of Patent: Jan. 28, 2003

(54) METHOD OF DESIGNING SEMICONDUCTOR INTEGRATED CIRCUIT DEVICE, METHOD OF ANALYZING POWER CONSUMPTION OF CIRCUIT AND APPARATUS FOR ANALYZING POWER CONSUMPTION

(75) Inventors: Tomonori Yonezawa, Fukuoka (JP); Takayuki Sasaki, Fukuoka (JP); Takahiro Kondo, Fukuoka (JP); Hiroki Otsuki, Fukuoka (JP); Tsuyoshi Nakamura, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 119 days.

(21) Appl. No.: 09/711,885

(22) Filed: Nov. 15, 2000

(30) Foreign Application Priority Data

Nov. 16, 1999 (JP) .......................................... 11-325065

(51) Int. Cl.[7] .............................................. G06F 17/50
(52) U.S. Cl. ............................................. 716/7; 716/2
(58) Field of Search .............................. 716/1–6, 7–18

(56) References Cited

U.S. PATENT DOCUMENTS

| | | | | |
|---|---|---|---|---|
| 5,553,002 A | * | 9/1996 | Dangelo et al. | 716/11 |
| 5,574,655 A | * | 11/1996 | Knapp et al. | 716/17 |
| 5,870,308 A | * | 2/1999 | Dangelo et al. | 716/2 |
| 6,289,488 B1 | * | 9/2001 | Dave et al. | 716/7 |
| 6,360,356 B1 | * | 3/2002 | Eng | 716/18 |

FOREIGN PATENT DOCUMENTS

JP          9-16642          1/1997

* cited by examiner

*Primary Examiner*—Matthew Smith
*Assistant Examiner*—Paul Dinh
(74) *Attorney, Agent, or Firm*—McDermott, Will & Emery

(57) ABSTRACT

The processing quantity of each description part is estimated through a source code analysis of a system operation description language or through simulation, or power consumption of each function is estimated through an operation description analysis of functions. Predetermined threshold values are set with respect to the processing quantity and the power consumption of each description part or function, so as to determine S/W and H/W implementation, and then, S/W and H/W partitioning is carried out. Thereafter, it is determined whether or not the total processing quantity or the total power consumption satisfies a desired design condition. Also, the S/W and H/W partitioning can be adjusted again in comprehensive consideration of the power consumption and the processing quantity, and the accuracy in the S/W and H/W partitioning can be improved by providing an instruction set simulator with a function to analyze power consumption. Moreover, an interface between S/W and H/W can be generated in the S/W and H/W partitioning so as to be automatically inserted into a S/W implemented part or a H/W implemented part.

22 Claims, 45 Drawing Sheets

Fig. 2

```
main()
{
        A:for statement for(Initialization;condition;update) {
                ...
        }

B:while statement

Initialization
        while(Condition) {
                ...
        }

C:do-while statement do{
                ...
        }while(Condition)
}
```

Fig. 3

Desired processing quantity: 120cycles ± 5cycles

|   | 1 | 2 | 3 |
|---|---|---|---|
| A | 80cycles (S/W) | 40cycles (H/W) | 40cycles (H/W) |
| B | 40cycles (S/W) | 40cycles (S/W) | 40cycles (S/W) |
| C | 60cycles (S/W) | 60cycles (S/W) | 40cycles (H/W) |
| Total | 180cycles | 140cycles | 120cycles OK |

Fig. 6(a)

| Desired processing quantity: 220cycles ± 5cycles |

|   | 1 | 2 | 3 | 4 | 5 |
|---|---|---|---|---|---|
| A | 100cycles (S/W) | 50cycles (H/W) | 50cycles (H/W) | 50cycles (H/W) | 50cycles (H/W) |
| B | 40cycles (S/W) | 60cycles (H/W) | 40cycles (S/W) | 40cycles (S/W) | 40cycles (S/W) |
| C | 80cycles (S/W) | 50cycles (H/W) | 50cycles (H/W) | 80cycles (S/W) | 50cycles (H/W) |
| D | 30cycles (S/W) | 40cycles (H/W) | 30cycles (S/W) | 30cycles (S/W) | 30cycles (S/W) |
| E | 50cycles (S/W) | 30cycles (H/W) | 30cycles (H/W) | 30cycles (H/W) | 50cycles (S/W) |
| Total | 300cycles | 230cycles | 200cycles | 230cycles | 220cycles OK |

Fig. 6(b)

Processing quantity

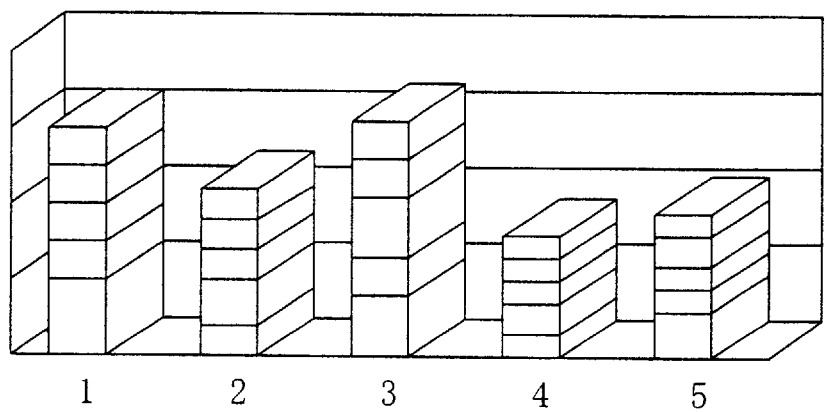

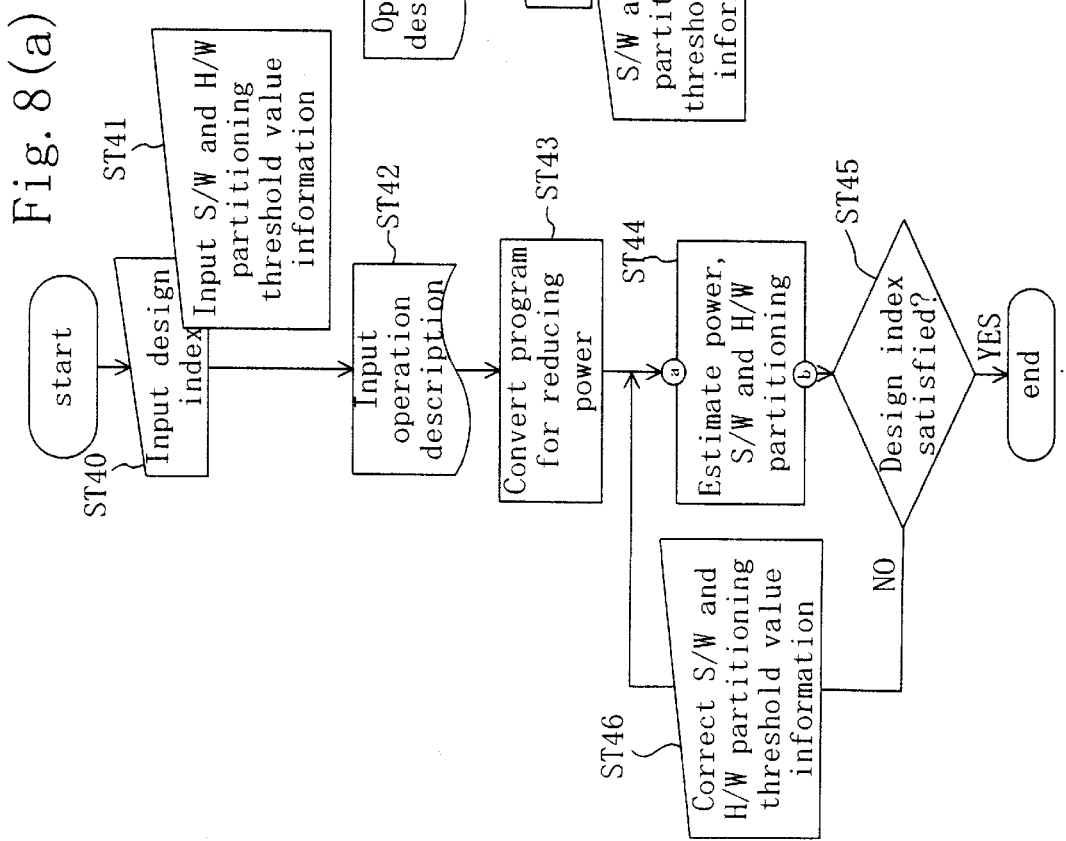

Determination of threshold value of use frequency analysis of general operation instruction in function Determination of threshold value of function invoke frequency analysis

Fig. 18(a)

8bit CRC
```
int crc8 (char *dd, int length)
{
  unsigned CRC1;
  unsigned carry, bit;
  unsigned char data;
  unsigned i,j;

CRC1=0×00;
  for (i=0; i<length; i++)
  {
    data=dd[i];
    for (j=1; j<=8; j++)
    {
      bit=(data >> (8-j)) & 1;
      carry=CRC1 & 0×80;
      CRC1 <<=1;
      if (!carry^!bit)
        CRC1=0×06;
    }
  }
  CRC1=~CRC1;
  return (CRC1);
}
```

Fig. 18(b)

16bit CRC
```
int crc16 (char *dd, int length)
{
  unsigned CRC1;
  unsigned carry, bit;
  unsigned char data;
  unsigned i,j;

CRC1=0×ffff;
  for (i=0; i<length; i++)
  {
    data = dd[i];
    for (j=1; j<=8; j++)
    {
      bit=(data >> (8-j)) &1;
      carry = CRC1 & 0×8000;
      CRC1 <<=1;
      if (!carry^!bit)
        CRC1=0×1021;
    }
  }
  CRC1=~CRC1;
  return (CRC1);
}
```

Fig. 18(c)

32bit CRC
```
int crc32 (char *dd, int length)
{
  unsigned CRC1;
  unsigned carry, bit;
  unsigned char data;
  unsigned i,j;

CRC1=0×ffffffffL;
  for (i=0; i<length; i++)
  {
    data=dd[i];
    for (j=1; j<=8; j++)
    {
      bit=(data >> (8-j)) & 1;
      carry =CRC1 & 0×80000000L;
      CRC1 <<=1;
      if (!carry^!bit)
        CRC1=0×04c11db7L;
    }
  }
  CRC1=~CRC1;
  return (CRC1);
}
```

Fig. 19

```
CRC
int crc (char *dd, int length, int initCrc, int mask, int parameter)
  {
    unsigned CRC1;
    unsigned carry, bit;
    unsigned char     data
    unsigned ij;

CRC1=initCrc;
    for (i=0; i<length; i++)
      {
        data=dd[i];
        for (j=1; j<=8, j++)
          {
            bit=(data >> (8-j)) & 1;
            carry=CRC1 & mask;
            CRC1 <<=1;
            if (!carry ^!bit)
               CRC1^=parameter;
          }
      }
      CRC1=~CRC1;
      return (CRC1);
  }
```

Fig. 21(a)

Result of block partitioning

|  |  | func0( ) | func1( ) | func2( ) | func3( ) | func4( ) | func5( ) |
|---|---|---|---|---|---|---|---|
| Processing quantity (cycle) | S/W | 10 | 20 | 30 | 40 | 50 | 40 |
|  | H/W | - | 10 | 20 | - | 30 | 30 |
| Power consumption (mW) | S/W | 10 | 20 | 30 | 40 | 50 | 40 |
|  | H/W | - | 10 | 40 | - | 90 | 20 |

Required specification  To lay stress on processing quantity
Processing speed：≦170cycle
Power consumption：≦170mW

Fig. 21(b)

First verification

|  |  | func0( ) | func1( ) | func2( ) | func3( ) | func4( ) | func5( ) |  |
|---|---|---|---|---|---|---|---|---|
| Processing quantity | S/W | 10 | 20 | 30 | 40 | 50 | 40 | 140 |
|  | H/W | - | 10 | 20 | - | 30 | 30 |  |
| Power consumption | S/W | 10 | 20 | 30 | 40 | 50 | 40 | 210 |
|  | H/W | - | 10 | 40 | - | 90 | 20 |  |

Second verification

|  |  | func0( ) | func1( ) | func2( ) | func3( ) | func4( ) | func5( ) |  |
|---|---|---|---|---|---|---|---|---|
| Processing quantity | S/W | 10 | 20 | 30 | 40 | 50 | 40 | 150 |
|  | H/W | - | 10 | 20 | - | 30 | 30 |  |
| Power consumption | S/W | 10 | 20 | 30 | 40 | 50 | 40 | 200 |
|  | H/W | - | 10 | 40 | - | 90 | 20 |  | nth verification

|  |  | func0( ) | func1( ) | func2( ) | func3( ) | func4( ) | func5( ) |  |
|---|---|---|---|---|---|---|---|---|
| Processing quantity | S/W | 10 | 20 | 30 | 40 | 50 | 40 | 160 |
|  | H/W | - | 10 | 20 | - | 30 | 30 |  |
| Power consumption | S/W | 10 | 20 | 30 | 40 | 50 | 40 | 170 |
|  | H/W | - | 10 | 40 | - | 90 | 20 |  |

Fig. 23(a)

```
FOR I=1 TO 10000
  SET FR0, 0
  SET FR0, 0
NEXT I
```

Source programA

Fig. 23(b)

```
FOR I=1 TO 10000
  SET FR0, 0
  SET FR0, 3
NEXT I
```

Source programB

Fig. 24(a)

```
........
........
SET FR2, 2
SET FR1, 0
ADD FR1, FR1, FR2
MUL FR3, FR1, 2
........
........
```

Source program

Fig. 24(b)

| Instruction | Power |
|---|---|
| ADD | 3 |
| SUB | 3 |
| MUL | 20 |
| SFT | 3 |
| SET | 1 |
| ... | ... |

Power information A

Fig. 24(c)

| Register | Bit transition number | Power |
|---|---|---|
| FR | 0 | 0 |
| FR | 1 | 0.2 |
| FR | 2 | 0.4 |
| FR | 3 | 0.6 |
| FR | 4 | 0.8 |
| ... | ... | ... |

Power information B

Fig. 25(a)

```
SET  FR2, 2
SET  FR1, 0
ADD  FR1, FR1, FR2
MUL  FR3, FR1, 2
```

Source program

Fig. 25(b)

```
SET=1, FR2(0000) →FR2(0010) =0.2
SET=1, FR1(0000) →FR1(0000) =0
ADD=3, FR1(0000) →FR1(0010) =0.2
MUL=20, FR3(0000) →FR3(0100) =0.2
```

Power analysis

Analysis result

Fig. 27 (a)

| Line number | Source program | Power |
|---|---|---|
| ..... | ..... | ..... |
| 1010 | SET LOOP1, 65535 | 2.8 |
| 1011 | ADD FR1, FR5, 7 | 6.5 |
| 1012 | MUL FR3, FR1, 2 | 20.2 |
| 1013 | MOV CR, FR3 | 4.6 |
| 1014 | RET LOOP | 3.2 |
| ..... | ..... | ..... |

Power analysis result

Fig. 27 (b)

| Instruction | Power |
|---|---|
| ADD | 3 |
| SUB | 3 |
| MUL | 20 |
| SFT | 3 |
| SET | 1 |
| ..... | ..... |

Power information

Fig. 27 (c)

| Line number | Source program | Power |
|---|---|---|
| ..... | ..... | ..... |
| 1010 | SET LOOP1, 65535 | 2.8 |
| 1011 | ADD FR1, FR5, 7 | 6.5 |
| 1012 | SFT FR3, FR1, 1 | 3.2 |
| 1013 | MOV CR, FR3 | 4.6 |
| 1014 | RET LOOP | 3.2 |
| ..... | ..... | ..... |

Power analysis result after changing program

| Line number | Source program | Power |
|---|---|---|
| ..... | ..... | ..... |
| 1010 | SET LOOP1, 65535 | 2.8 |
| 1011 | ADD FR1, FR5, 7 | 6.5 |
| 1012 | MUL FR3, FR1, 2 | 20.2 |
| 1013 | MOV CR, FR3 | 4.6 |
| 1014 | RET LOOP | 3.2 |
| ..... | ..... | ..... |

Power analysis result

Generated H/W circuit
Connect FR1 and FR3 through buses shifted by 1 bit

| Line number | Source program | Power |
|---|---|---|
| ..... | ..... | ..... |
| 1010 | SET LOOP1, 65535 | 2.8 |
| 1011 | ADD FR1, FR5, 7 | 6.5 |
| 1012 | CALL HW | 2.2 |
| 1013 | MOV CR, FR3 | 4.6 |
| 1014 | RET LOOP | 3.2 |
| ..... | ..... | ..... |

Fig. 32(a)

Example of operation description (S/W including functions main, func1 and func2 and described by C language)

```
void main() {                    void func1(int*data1, int*data2) {
    int data1[3], data2[3];          Initialize data1[3]
    int result;                      Initialize data2[3]
                                 }
    func1(data1, data2);         int func2(int*data1, int*data2) {
                                     int result, i;
    fesult=func2(data1, data2);
}                                    result=0;
                                     for(i=0;i<3;i++) {
                                         result+=(data1[i]+data2[i]);
                                     }
                                     return result;
                                 }
```

Fig. 32(b)

Example of partitioning information (with function func2 implemented by H/W and other functions (main and func1) implemented by S/W)

```
Functions main and func1 → S/W implementation
Function func2 → H/W implementation
```

Fig. 33(a) Operation description

```
void main ( ) {
    int data1[3], data2[3];
    int result;

func1 (data1, data2);
    result=func2 (data1, data2);
}
void func1 (int *data1, int *data2) {
    Initialize data1[3]
    Initialize data2[3]
}
int func2 (int *data1, int *data2) {
    int result, i;
    result=0;
    for (i=0; i<3; i++) {
        result+=(data1[i]+data2[i]);
    }
    return result;
}
```

Fig. 33(b) Partitioning information

Functions main and func1 → S/W implementation
Function func2 → H/W implementation Fig. 33(c) S/W implemented operation description

```
void main ( ) {
    int data1[3], data2[3];
    int result;

func1 (data1, data2);
    result=func2 (data1, data2);
}
void func1 (int *data1, int *data2) {
    Initialize data1[3]
    Initialize data2[3]
}
int func2 (int *data1, int *data2) {
```

Fig. 33(d) H/W implemented operation description

```
    int result, i;

result=0;
    for (i=0; i<3; i++) {
        result+=(data1[i] + data2[i]);
    }
    return result;
}
```

Fig. 40(a)

Example of operation description (S/W including functions main, func1 and func2 and described by C language

```
void main(){
    int data1[3],data2[3];
    int result;

func1(data1,data2);

result=func2(data1,data2);
}
```
```
void func1(int*data1,int*data2) {
    Initialize data1[3]
    Initialize data2[3]
} int func2(int*data1_hw, int*data2_hw) {
    int result_hw,i;

result_hw=0;
    for(i=0;i<3;i++) {
        result_hw+=(data1_hw[i]+data2_hw[i]);
    }
    return result_hw;
}
```

Fig. 40(b)

Example of partitioning information (with function func2 implemented by H/W and other functions (main and func1) implemented by S/W)

Functions main and func1 → S/W implementation
Function func2 → H/W implementation Fig. 41(a)
Operation description

```
void main () {
    int data1[3], data2[3];
    int result;
    func1 (data1, data2);
    result=func2 (data1, data2);
}
void func1 (int *data1, int *data2)
    Initialize data1[3]
    Initialize data2[3]
}
int func2 (int *data1_hw, int *data2_hw) {
    int result_hw, i;
    result_hw=0;
    for (i=0; i<3; i++) {
        result_hw+=(data1_hw[i]+data2_hw[i]);
    }
    return result_hw;
}
```

Fig. 41(b)
Partitioning information

Functions main and func1 → S/W implementation
Function func2 → H/W implementation

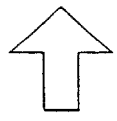

Fig. 41(c)
S/W implemented operation description

```
void main () {
    int data1[3], data2[3];
    int result;
    func1 (data1, data2);
    result=func2 (data1, data2);
}
void func1 (int *data1, int *data2) {
    Initialize data1[3]
    Initialize data2[3]
}
int func2 (int *data1_hw, int *data2_hw);
```

Fig. 41(d)
H/W implemented operation description

```
int result_hw, i;
result_hw=0;
for (i=0; i<3; i++) {
    result_hw+=(data1_hw[i] + data2_hw[i]);
}
return result_hw;
```

Fig. 42

H/W implemented operation description

```
in result_hw,i;
result_hw=0;
for(i=0;i<3;i++){
result_hw+=(data1_hw[i]+data2_hw[i]
);
}
return result_hw;
```

Add ⇨

Interface part peripheral circuit operation description

```
void inter face(int control){
Control of processor memory access
Fetch of input data
Output of operation result
Generation of interrupt
etc.
}
```

On side of interface part peripheral circuit

Control for inhibiting access to data memory of processor while H/W is making access to data memory for fetching input data or outputting operation result, automatic fetch of input data in activating H/W, automatic output of operation result in ending operation of H/W, generation of interrupt of processor after outputting operation result of H/W, etc.

Fig. 44
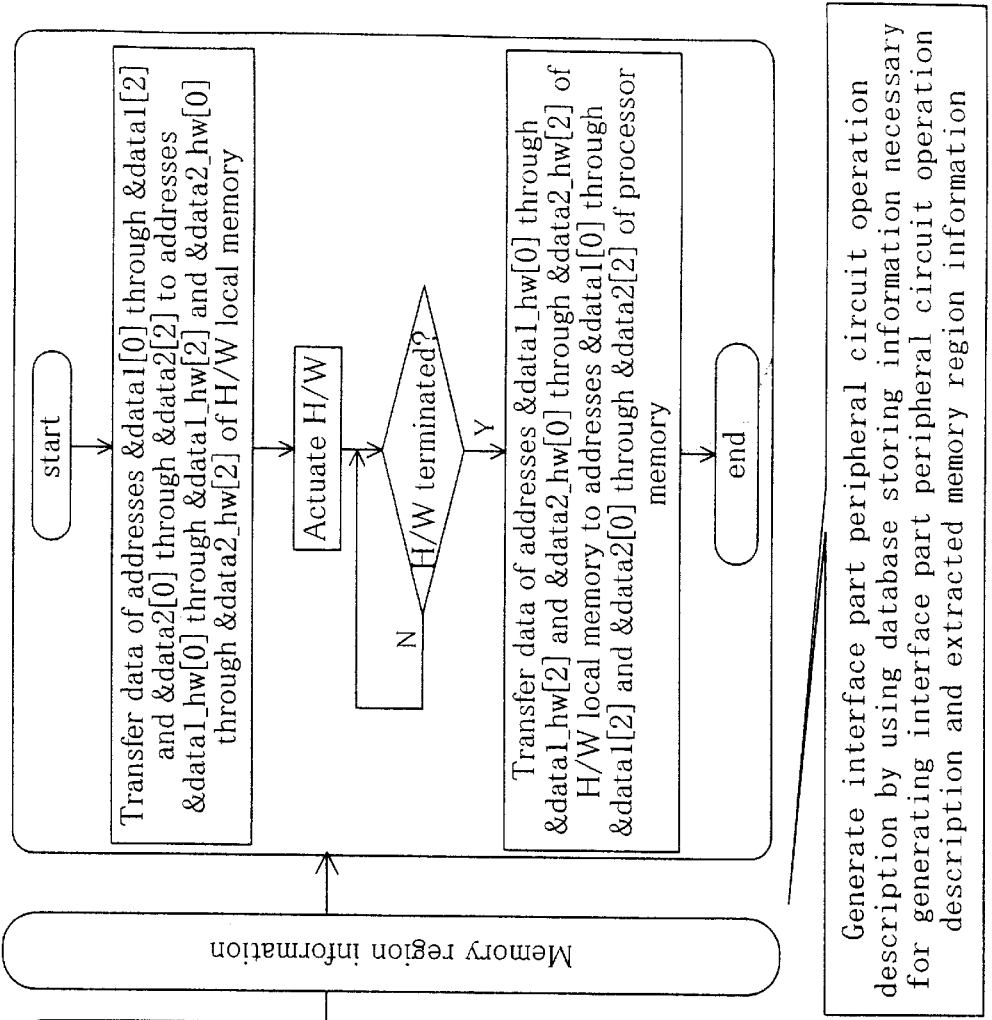
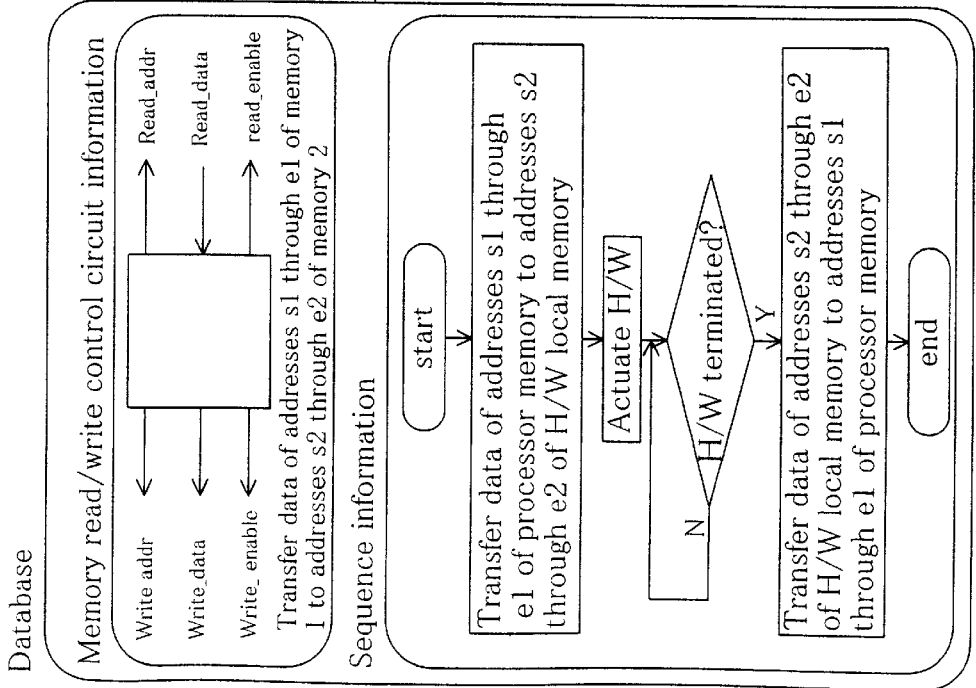

METHOD OF DESIGNING SEMICONDUCTOR INTEGRATED CIRCUIT DEVICE, METHOD OF ANALYZING POWER CONSUMPTION OF CIRCUIT AND APPARATUS FOR ANALYZING POWER CONSUMPTION

BACKGROUND OF THE INVENTION

The present invention relates to a method of partitioning specifications and functions required in designing a semiconductor integrated circuit device between hardware implementation and software implementation.

It is conventionally significant to determine, in design of a semiconductor integrated circuit device, which part of specifications and functions required for the system is implemented by software and which part is implemented by hardware. This is because significant characteristics such as the power consumption, the layout area and the throughput are affected depending upon how they are partitioned between software implementation and hardware implementation.

In design of a semiconductor integrated circuit device, a designer appropriately partitions the specifications and functions required for the system between hardware implementation and software implementation in consideration of developing process techniques, circuit techniques and device characteristics. Thus, the partitioning is currently entrusted to the skill of a designer.

Since the scale of a semiconductor integrated circuit device to be designed is enlarging and a large scaled system designated as a system LSI is desired to be constructed, it is difficult to improve the design efficiency merely by relaying upon the skill of a designer.

Accordingly, a technique for automatic partitioning between hardware implementation and software implementation is desired in the design of a semiconductor integrated circuit device. There remain, however, a number of unsolved problems in how the partitioning is automated with stress laid on which characteristic.

SUMMARY OF THE INVENTION

An object of the invention is realizing automatic partitioning between software implementation and hardware implementation by using a processing quantity and power consumption as parameters, generating an interface between hardware and software necessary in the partitioning and providing further means for increasing a processing speed and reducing power consumption.

The first method of designing a semiconductor integrated circuit device of this invention comprises the steps of (a) extracting description parts describing a loop processing part or a function by analyzing a system operation description language describing operations of the semiconductor integrated circuit device to be designed; (b) partitioning each of the description parts extracted from the system operation description language into a H/W implemented description when a processing quantity corresponding to a number of clock cycles of the description part exceeds a threshold value and into a S/W implemented description when the processing quantity is smaller than the threshold value; (c) calculating a sum of the processing quantities of the description parts as a total processing quantity; and (d) determining whether or not the calculated total processing quantity meets a condition.

According to this method, appropriate S/W and H/W partitioning can be automatically conducted with appropriately keeping the total processing quantity of the semiconductor integrated circuit device. In particular, by initially setting not only the condition but also a threshold value of a processing quantity of a description part to be implemented by H/W, it is possible to avoid a problem that a layout area and power consumption are too large due to too many H/W implemented description parts. In this method, simulation may be conducted, but the S/W and H/W partitioning can be carried out by checking the contents of the description parts of the system operation description language through a source code analysis without conducting simulation.

The first method can further comprise a step (e) of converting a description of one of the description parts and returning to the step (c) when the total processing quantity does not meet the condition in step (d), so that the step (e) can be repeatedly conducted until the total processing quantity meets the condition. In this manner, a constraint derived from the threshold value can be gradually eased, so as to design a semiconductor integrated circuit device satisfying the desired condition.

Furthermore, when the total processing quantity does not meet the condition after conducting the step (e) on all of the description parts, a procedure can return to the step (b) after easing the condition. In this manner, a state where the design is impossible because of an unreasonable condition can be avoided.

The threshold value can be given as a number of condition divergences appearing in the description part.

Also, the condition can be a desired range or an upper limit of the total processing quantity.

The first method of designing a semiconductor integrated circuit device can further comprise a step of obtaining total power consumption on the basis of all of the description parts partitioned between the H/W implemented description and the S/W implemented description, and when the total power consumption does not meet a condition, a procedure can return to the step (c) after converting a description of one of the description parts. In this manner, the S/W and H/W partitioning can be conducted also in consideration of power consumption.

The second method of designing a semiconductor integrated circuit device of this invention comprises the steps of (a) obtaining power consumption of each function by analyzing functions included in a system operation description language describing operations of the semiconductor integrated circuit device to be designed; (b) partitioning the function into a H/W implemented function when the power consumption of the function exceeds a threshold value and into a S/W implemented function when the power consumption is smaller than the threshold value; (c) calculating a sum of the power consumption of all of the functions as total power consumption by estimating the power consumption of each function; and (d) determining whether or not the calculated total power consumption meets a condition.

According to this method, the S/W and H/W partitioning for reducing power consumption can be automatically conducted. Accordingly, the efficiency in designing an LSI with small power consumption and the performance of the semiconductor integrated circuit device to be designed can be both improved.

In the second method, at least a use frequency of a general operation instruction in the function can be analyzed in the step (c), and the threshold value can be a value corresponding to an effect to reduce power consumption attained by H/W implementation of the function.

Alternatively, at least an invoke frequency of the function can be analyzed in the step (c), and the threshold value can be a value obtained by partitioning a value corresponding to an effect to reduce power consumption attained by H/W implementation of the function by a smallest processing quantity among processing quantities of the functions.

When the total power consumption does not meet the condition in the step (d), the step (c) can be repeatedly conducted after reducing the threshold value.

Furthermore, probability of increase of an operation speed through H/W implementation can be further analyzed in the step (c), and when throughput attained after increasing the operation speed is larger than throughput attained before increasing the operation speed, the function can be implemented by H/W. In this manner, a semiconductor integrated circuit device with large throughput can be designed in consideration of probability of employment of parallel processing and pipeline processing.

In this method, power optimization can be conducted in the step (c) by at least one of reduction of an operation frequency of each function, use of gated clock, reduction of a supply voltage and bus coding.

Furthermore, when the condition of the step (d) is that a value obtained by multiplying a processing quantity of the function attained through H/W implementation by power consumption of a unit process of a processor is larger than power consumption of the function attained through H/W implementation, the effect to reduce power consumption can be definitely attained.

The second method can further comprise a step of obtaining a total processing quantity as a sum of processing quantities of all of the functions partitioned between the H/W implemented function and the S/W implemented function, and when the total processing quantity does not meet a condition, a procedure can return to the step (b) after converting a description of one of the functions. In this manner, a state where the design is impossible can be avoided.

The third method of designing a semiconductor integrated circuit device of this invention comprises the steps of (a) inputting a system operation description language describing operations of the semiconductor integrated circuit device to be designed and partitioning the system operation description language into respective elements; (b) detecting plural elements including a common process flow by analyzing the respective elements; (c) integrating the plural elements including the common process flow into a single element; and (d) partitioning the respective elements into a H/W implemented element and a S/W implemented element in accordance with characteristics thereof after the step (c).

The third method can further comprise, after the step (d), a step of determining whether or not the H/W implemented element and the S/W implemented element meet a condition, and when a result of determination is negative, a procedure can return to the step (c) for changing integration of the elements.

The method of this invention of analyzing power consumption of a circuit including at least a register, comprises the steps of (a) supplying a first source program including an instruction for repeating change between a first data and a second data N times, wherein N is a fixed natural number, for causing transition of a bit number in the register; (b) estimating power consumption through simulation of a circuit operation in accordance with the first source program and storing first power obtained as a result of estimation in storage means; (c) supplying a second source program including an instruction for repeating change between a third data and a fourth data N times for causing no bit transition in the register; (d) estimating power consumption through simulation of a circuit operation in accordance with the second source program and storing second power obtained as a result of estimation in the storage means; and (e) obtaining power consumed in causing the transition of the bit number in the register by dividing a difference between the first power and the second power by 2N.

In this manner, a power value required for data change in a register can be accurately analyzed with background noise eliminated.

The first apparatus for analyzing power consumption, functioning as an instruction set simulator, of this invention comprises test pattern generating means for generating a first source program including an instruction for repeating change between a first data and a second data N times, wherein N is a fixed natural number, for causing transition of a bit number in a register and a second source program including an instruction for repeating change between a third data and a fourth data N times for causing no bit transition in the transistor; and power analyzing means for receiving an output from the test pattern generating means, conducting simulation in accordance with the first and second source programs and analyzing power consumed in causing the transition of the bit number in the register.

The aforementioned effect can be attained also by this apparatus.

The second apparatus for analyzing power consumption, functioning as an instruction set simulator, of this invention comprises source program storing means for storing a source program consisting of plural processes including instructions; power information storing means for storing power information regarding power consumption of each of the instructions; and power analyzing means for conducting simulation by using the power information stored in the power information storing means in accordance with the source program and analyzing power consumed in executing the source program.

According to this apparatus, a process (instruction or register) with large power consumption can be rapidly detected in a circuit to be designed, so as to provide means for reducing power consumption.

The power information preferably includes information of power consumption in accordance with a bit transition number of a register.

The fourth method of this invention for a semiconductor integrated circuit device using an instruction set simulator, comprises the steps of (a) analyzing power consumption by conducting simulation in accordance with a source program consisting of plural processes including instructions by using the instruction set simulator; (b) obtaining power consumption of each process on the basis of a result of analysis of the power consumption of the step (a); (c) detecting, on the basis of power consumption of the respective processes obtained in the step (b), a specified process having power consumption larger than a threshold value; and (d) changing an instruction in the specified process into another instruction for reducing power consumption with keeping a result of the specified process.

According to this method, power consumption can be easily reduced by design change. In particular, by previously setting a threshold value, a process whose power consumption can be reduced is easily detected, and the power consumption can be reduced by automatic change of an instruction.

The fourth method further comprises a step of generating power information regarding power consumption of each of the respective processes, and power consumption of the specified instruction changed in the step (d) can be registered in the power information as an abnormality informing value. In this manner, the simulator is informed of a H/M implemented process, and the actual power consumption of the process is calculated by automatic simulation or the like.

The fifth method of designing a semiconductor integrated circuit device of this invention comprises the steps of (a) inputting a system operation description language describing operations of the semiconductor integrated circuit device to be designed; (b) inputting partitioning information including information used for S/W and H/W partitioning of respective operation descriptions of the system operation description language; (c) partitioning the respective operation descriptions of the system operation description language between a H/W implemented operation description and a S/W implemented operation description on the basis of the partitioning information; and (d) automatically generating an interface between S/W and H/W.

According to this method, an interface for smoothly controlling data input/output between a S/W implemented part and a H/W implemented part and controlling the operation of the H/W implemented part by the S/W implemented part can be automatically generated in the S/W and H/W partitioning. Therefore, the design efficiency and the quality of the semiconductor integrated circuit device to be designed can be both improved.

The fifth method can further comprise, after the step (d), a step of adding the interface between S/W and H/W to the S/W implemented operation description.

In the fifth method, a database including information used for generating the interface between S/W and H/W can be previously prepared, the method can further include a step of extracting a description regarding data input/output of H/W and a description regarding an operation of a processor from the S/W implemented operation description and the H/W implemented operation description partitioned in the step (c), and the interface between S/W and H/W generated in the step (d) can include a description regarding data input/output between the processor and the H/W and a description regarding determination of termination of a process of the H/W.

The fifth method can further comprise, after the step (d), a step of adding the interface between S/W and H/W to the H/W implemented operation description.

Furthermore, in the fifth method, a database including information used for generating the interface between S/W and H/W can be previously prepared, the method can further include a step of extracting a description regarding data input/output of H/W and a description regarding an operation of a processor from the S/W implemented operation description and the H/W implemented operation description partitioned in the step (c), and an interface peripheral circuit operation description for operating H/W generated by the H/W implemented operation description can be generated in the step (d).

BRIEF DESCRIPTION OF THE DRAWINGS

FIG. 2 is a diagram for showing a typical system description language to be partitioned between software implementation and hardware implementation in the first example of Embodiment 1;

FIG. 3 is a diagram for showing an analysis result obtained in the first example of Embodiment 1;

FIGS. 6(a) and 6(b) are a table and a graph for showing an analysis result obtained in the second example of Embodiment 1;

FIGS. 8(a) and 8(b) are a flowchart for showing a software and hardware partitioning method in converting a program for reducing power in Embodiment 2 and a schematic block diagram for showing the structure of a design apparatus used in this case;

FIGS. 18(a), 18(b) and 18(c) are diagrams for showing examples of descriptions of functions prior to integration in Embodiment 3;

FIG. 19 is a diagram for showing an example of a description of a function after the integration in Embodiment 3;

FIG. 21(a) is a diagram for showing a processing quantity and power consumption of each function after block division in Embodiment 4 and FIG. 21(b) is a diagram for showing examples of the processing quantity and power consumption of each function in the 1st through nth verifications;

FIGS. 23(a) and 23(b) are diagrams for illustrating a method of analyzing power consumed by an instruction of a source program in the first example of Embodiment 5;

FIGS. 24(a), 24(b) and 24(c) are diagrams for respectively showing a source program, power information 1 and power information 2 used in the second example of Embodiment 5;

FIGS. 25(a), 25(b) and 25(c) are diagrams for respectively showing instructions in the source program, operation procedures of power analysis and an analysis result of the second example of Embodiment 5;

FIGS. 27(a), 27(b) and 27(c) are tables for respectively showing a power analysis result, power information and a power analysis result after changing a program in the third example of Embodiment 5;

FIGS. 32(a) and 32(b) are diagrams for respectively showing an example of an operation description and an example of partitioning information input in a design flow in the first example of Embodiment 6;

FIGS. 33(a), 33(b), 33(c) and 33(d) are diagrams for respectively showing examples of an operation description, partitioning information, a software implemented operation description and a hardware implemented operation description used in the first example of Embodiment 6;

FIGS. 40(a) and 40(b) are diagrams for respectively showing an example of an operation description and an example of partitioning information input in a design flow in the second example of Embodiment 6;

FIGS. 41(a), 41(b), 41(c) and 41(d) are diagrams for respectively showing examples of an operation description, partitioning information, a software implemented operation description and a hardware implemented operation description used in the design of the second example of Embodiment 6;

FIG. 42 is a diagram for showing a process for adding an interface peripheral circuit operation description to the hardware implemented operation description generated in the design flow of the second example of Embodiment 6;

FIG. 44 is a diagram for illustrating a method of automatically generating the interface peripheral circuit operation description by using a database and hardware local memory region information in the design flow of the second example of Embodiment 6.

DETAILED DESCRIPTION OF THE INVENTION

Embodiment 1

In Embodiment 1, a method of partitioning a description part with a large processing quantity between software (SIW) implementation and hardware (H/W) implementation on the basis of a result of estimating the processing quantity of a system (operation) description language. In other words, on the basis of a result of estimating the processing quantity of a system (operation) description language describing operations of a system to be designed, a description part describing a loop processing part or a function with a large processing quantity (namely, highly loaded) is extracted, so as to be replaced with a description apt for hardware (H/W) implementation such as pipeline processing and parallel processing. For this purpose, a highly loaded routine is searched for and extracted in this embodiment, so as to be partitioned into a part implemented by software (S/W) or a part implemented by hardware (H/W).

FIRST EXAMPLE

This example describes procedures in a static analysis of a description part describing a loop processing part or a function in the process for searching for and extracting a highly loaded processing routine.

Figure 1:
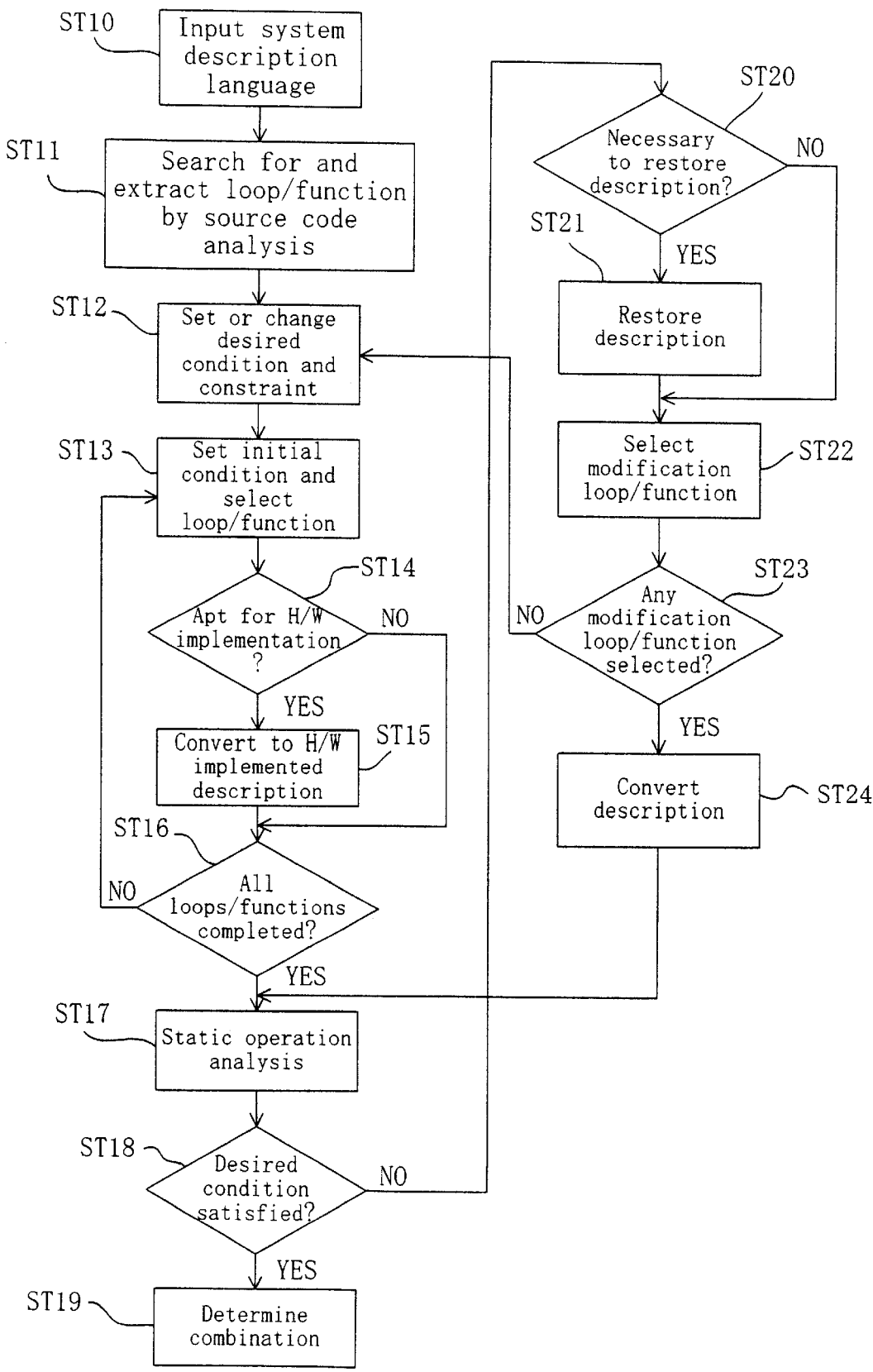
FIG. 1 is a flowchart for showing procedures in a static analysis of a description part describing a loop processing part or a function conducted in a first example of Embodiment 1 according to the invention.
Figures 4A, 4B, 4C:
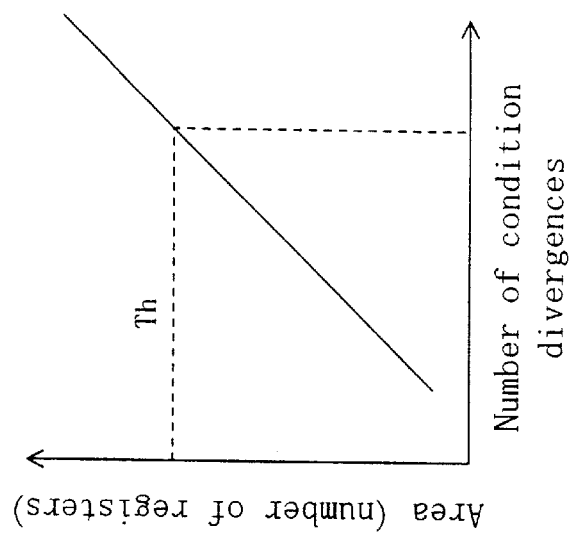
FIGS. 4(a) and 4(b) are diagrams for showing a syntax analysis result of a loop processing part or a function extracted through a source code analysis in the first example of Embodiment 1 and FIG. 4(c) is a diagram for showing the correlation between the area and the number of condition divergences.

FIG. 1 is a flowchart for showing procedures in the static analysis of a description part describing a loop processing part or a function in this example. FIG. 2 shows a typical system description language to be partitioned between software implementation and hardware implementation in this example. FIG. 3 is a diagram for showing the result of the analysis obtained in this example. FIGS. 4(a) and 4(b) are diagrams of a syntax analysis result of the loop processing part or the function extracted by analyzing a source code, and FIG. 4(c) is a diagram for showing the correlation between the area (the number of registers) and the number of condition divergences. Now, the procedures in the static analysis will be described in accordance with the flow shown in FIG. 1 with reference to FIGS. 2, 3 and 4(a) through 4(c). Herein, a "static analysis" means an analysis conducted on the basis of the contents of a program alone without actually carrying out simulation.

First, in step ST10, a system (operation) description language which describes the operations of a system to be designed is input. At this point, a system description language of the kind as is shown in FIG. 2 appears. For example, a description A is a for statement which means that a process is repeated until a given condition is attained, a description B is a while statement which means that a process is repeated while an initially set condition is held, and a description C is a do-while statement which means that a process is repeated as far as a given condition is held.

Next, in step ST11, a loop processing part or a function is extracted through a source code analysis. At this point, as is shown in FIGS. 4(a) and 4(b), in the case where a large number of variables are used or in the case where the process is complicated because of a large number of condition divergences occurring in the loop processing part or the function, namely, in the case where the dependence of variables is small, the description is more preferably implemented by software, namely, by using a general processor, than by hardware. On the contrary, in the case where a small number of variables are used, the number of condition divergences is small and a simple operation minimally depending upon variables is repeated, the description is preferably implemented by hardware. For example, in the examples shown in FIGS. 4(a) and 4(b), the number M of used registers is large and the number of condition divergences is large in a function FuncA, and hence, this is a description part not apt for hardware implementation. On the other hand, the number N of used registers is small (M>>N) and the number of repeated operations is large in a function FuncB, and hence, this is a description part apt for hardware implementation.

Then, in step ST12, a desired condition and a constraint (threshold value) of a processing quantity are set. The desired condition of the processing quantity is expressed as the number of clock cycles necessary to execute a target instruction. The desired condition is, for example, that the total number of clock cycles is smaller than a given value or that the total number of clock cycles is within a given range. In this example, the desired condition is set as is shown in FIG. 3 as follows: "The total processing quantity (number of clock cycles) of the description A, the description B and the description C is 120±5 cycles." Furthermore, the constraint is, for example, that the layout area (number of registers) shown in FIG. 4(c) is smaller than a threshold value Th, or that the number of condition divergences is smaller than a given threshold value. Since the number of registers and the number of condition divergences are generally in proportion to each other as is shown in FIG. 4(c), one of them can be defined by defining the other. In this example, these conditions are input by a designer in accordance with the requirements of the system. As the desired condition, the upper limit alone, for example, "to be smaller than 120 cycles", may be set.

Next, in step ST13, a description part of the loop processing part or a description part including the function is initialized to a S/W implemented description, and a description part for aptitude determination is extracted. In this example, all description parts are set as S/W implemented descriptions as the initial condition.

Then, in step ST14, with respect to each block of the loop processing part or the function extracted in step ST12, the aptitude for S/W and H/W implementation is determined on the basis of the aforementioned factors. At this point, for automatically determining whether or not a description is apt for H/W implementation, the description is determined to be apt for S/W implementation when the number of registers is larger than the threshold value Th shown in FIG. 4(c) and is determined to be apt for H/W implementation when the number is smaller than the threshold value Th. In this example, each description is determined as a software implemented part or a hardware implemented part depending upon, for example, whether or not the total number of condition divergences and registers is larger than a given value, so that the description can be partitioned into a S/W block or a H/W block. It is obvious from the correlation between the number of condition divergences and the number of registers shown in FIG. 4(c) that the number of condition divergences can be employed as an index of the determination.

Alternatively, without conducting the initialization of step ST13, when NO in the determination of step ST14, the procedure may proceed to the determination of step ST16 after changing the description into a S/W implemented description.

Also, with respect to the loop processing part, the determination can be made depending upon whether or not the number of repeating the loop processing is larger than a given value.

Next, in step ST15, in accordance with the determination made in step ST14, when the description is determined to be apt for H/W implementation, the description is converted into a H/W implemented description. When the description is not apt for H/W implementation, the procedure proceeds to step ST17 without conversion.

Then, in step ST17, the processing quantity (the number of clock cycles) is estimated through the static operation analysis based on the contents of the program.

Next, it is determined in step ST18 whether or not the number of clock cycles necessary for executing all the description parts meets the desired condition (for example, 120±50 cycles). When the desired condition is satisfied, the procedure proceeds to step ST19, where a combination of S/W implementation and H/W implementation is determined.

On the other hand, when the desired condition is not satisfied in step ST18, procedures of steps ST20 through ST24 are carried out. When the procedure first proceeds to step ST20, there is no need to restore a description in step ST20, and hence, the procedure directly proceeds to step ST22. In step ST22, one modification loop/function is selected from the description part. For example, in the case where the number of clock cycles is determined in step ST18 to be larger than 120±5 cycles, one having the largest processing quantity (number of clock cycles) among the description parts specified as S/W implementation is selected as the modification loop/function. In the second or later selection, the modification loop/function selected in the previous selection in step ST22 is excluded. On the other hand, in the case where the number of clock cycles is determined in step ST18 to be smaller than 120±5 cycles, a loop/function with the smallest reduced processing quantity is selected as the modification loop/function in step ST22 from the block specified as H/W implementation.

Then, in step ST23, it is determined whether or not there is any modification loop/function selected for modification, and when the modification loop/function is present, its description is reversed in step ST24. Specifically, when the modification loop/function is expressed as a S/W implemented description, the description is converted into a H/W implemented description, and when it is expressed as a H/W implemented description, the description is converted into a S/W implemented description. Since this process is carried out with respect to each description, the description of another description part is not modified. In this manner, the constraint (threshold value) set in step ST12 is automatically changed.

Thereafter, the procedure returns to step ST17 where the aforementioned operation analysis is carried out and the determination is made in step ST18, so that the procedures of steps ST20 through ST24 can be repeated until the desired condition is attained. In this case, with respect to the modification loop/function whose description has been reversed in the previous process in step ST24, it is determined in step ST20 whether or not the reversed description is necessary to be restored. When it is necessary to restore the description, the description is restored in step ST21 before conducting the procedure of step ST22. It is determined in step ST20 whether the description is necessary to be restored because the processing quantity (number of clock cycles) may be changed beyond the desired range due to the reverse of the description in step ST22.

On the other hand, in the case where the desired condition cannot be attained although the operation analysis is carried out repeatedly with the descriptions of all the description parts respectively reversed by repeating the procedures of steps ST20 through ST24, there is a possibility that the desired condition itself is unreasonable. Therefore, the procedure returns to step ST12, where the desired condition is changed so as to repeat the procedures from step ST13 on. The desired condition can be automatically changed by, for example, increasing the initial desired condition by a given value at a time.

For example, in the case where the desired condition is, as is shown in FIG. 3, that "the processing quantity (number of clock cycles) is 120±5 cycles", when all the descriptions A, B and C corresponding to the loop processing part or the function shown in FIG. 2 are S/W implemented descriptions, the total processing quantity (number of clock cycles) is 180 cycles, which does not meet the desired condition. If the description A alone is converted into a H/W implemented description in the initial procedures of steps ST13 through ST16, the total processing quantity (number of clock cycles) becomes 140 cycles, which still does not meet the desired condition although the processing quantity is thus reduced. Therefore, the description C having the largest processing quantity among the S/W implemented descriptions is converted into a H/W implemented description through the procedures of steps ST20 through ST24. As a result, the total processing quantity becomes 220 cycles, which meets the desired condition.

Accordingly, in this example, when the processing quantity (number of clock cycles) is desired to be set within an appropriate range in design of an integrated circuit device (system), S/W implementation and H/W implementation can be appropriately and automatically partitioned on the basis of the contents of a program without conducting simulation. In particular, since not only the desired condition but also the constraint of a description part to be implemented by H/W are initially set, it is possible to previously avoid a problem that the layout area and power consumption are excessively large due to a large number of description parts implemented by H/W. Furthermore, although the desired condition and the constraint are initially input by a designer, the constraint and the desired condition are automatically changed thereafter, and hence, the H/W and S/W partitioning can be automatically carried out.

Also, since the desired condition is set by specifying a given range, for example, "120±5 cycles", hardware (H/W) implemented parts can be kept within a more appropriate range in consideration of the balance of the entire system as compared with the case where the desired condition is set by specifying the upper limit alone.

Furthermore, with the desired condition initially set to a severe range, for example, "120±1 cycles", the range may be automatically changed to be increased by ±1 cycle every time the procedure returns to step ST12 thereafter. Even when the design becomes impossible due to an unreasonable condition, the desired condition can be eased in this manner, so that the H/W and S/W partitioning can be automatically carried out.

SECOND EXAMPLE

In this example, procedures in a dynamic analysis of a loop processing part or a function in the process for searching for and extracting a highly loaded processing routine will be described.

Figure 5:
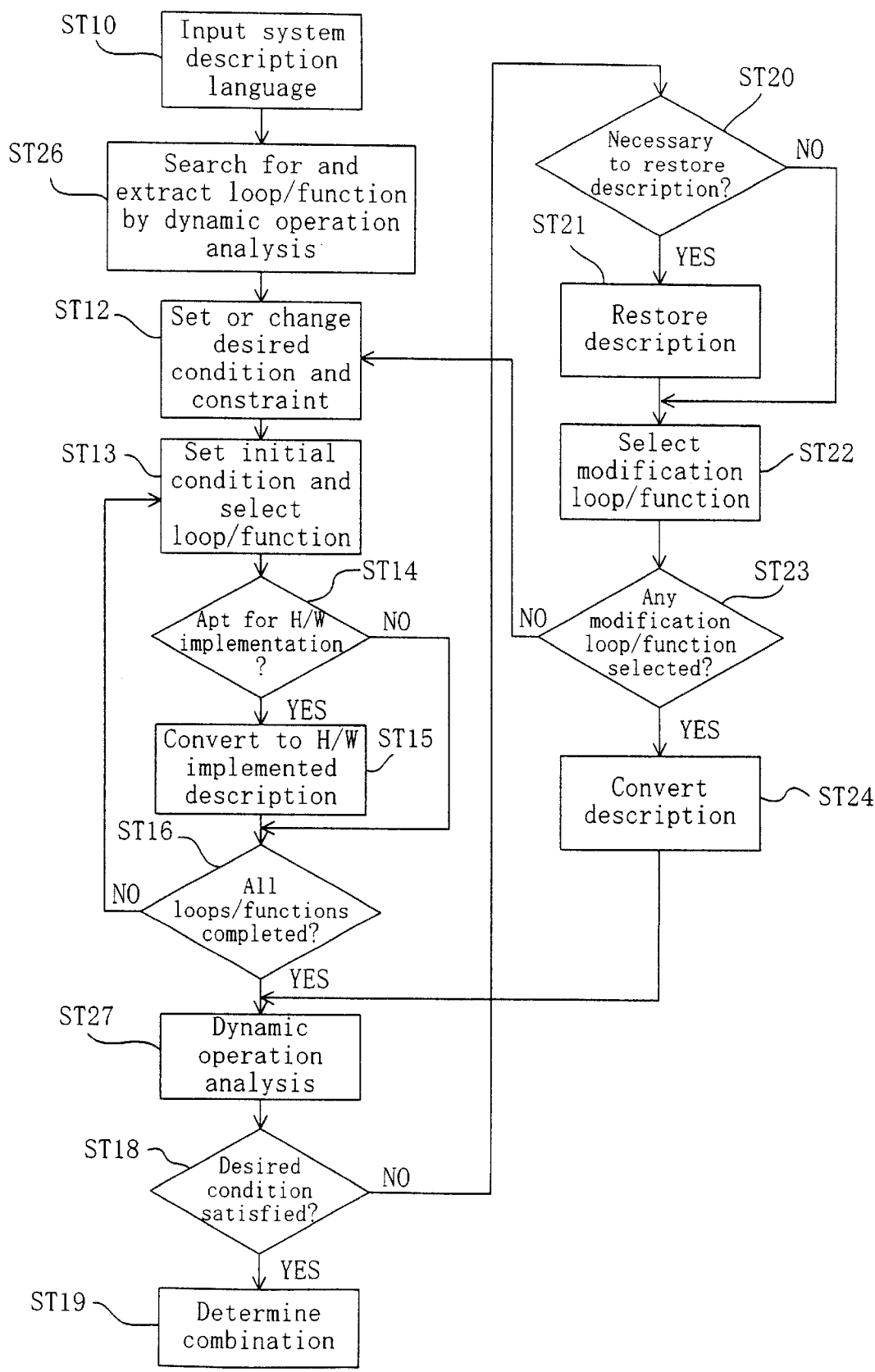
FIG. 5 is a flowchart for showing procedures in a static analysis of a loop processing part or a function conducted in a second example of Embodiment 1.

FIG. 5 is a flowchart for showing procedures in the dynamic analysis of a loop processing part or a function in this example. FIGS. 6(a) and 6(b) are a table and a graph for showing an analysis result obtained in this example. Now, the procedures in the dynamic analysis will be described in accordance with the flow of FIG. 5 with reference to FIGS. 6(a) and 6(b). The "dynamic analysis" herein means an analysis on the basis of actually conducted simulation.

The basic flow of this example is substantially the same as that of the first example, and the procedures the same as those of the first example are referred to by using the same step numbers so as to omit the description, and procedures different from those of the first example are mainly described.

In this example, in step ST26, instead of the source program analysis carried out in step ST11 of the first example, the dynamic analysis is carried out with all loop processing parts and functions set to S/W implemented descriptions. Specifically, simulation is executed for PC-Trace analysis, so as to search for and extract a loop processing part or a function with a large processing quantity. It is herein assumed that a description A, a description B, a description C, a description D and a description E are extracted.

Next, it is assumed, in this example, in setting the desired condition and the constraint of the processing quantity in step ST12, that the desired condition is, as is shown in FIG. 6(a), that "the total processing quantity (number of clock cycles) of the description A, the description B, the description C, the description D and the description B is 220±5 cycles". The constraint is assumed to be that "a reduced processing quantity is larger than a predetermined value".

In step ST13, with all the loop processing parts and functions initially set to S/W implemented descriptions, each description part is selected so as to determine in step ST14 whether or not the description is apt for H/W implementation. In this case, the simulation is carried out with the selected loop processing part or function converted into a H/W implemented description. It is determined that the loop processing part or function whose processing quantity cannot be reduced by the predetermined value through the H/W implementation is not apt for H/W implementation. In this case, the appearance frequency of a description part, which is not found in the static analysis of the first example, can be found. Therefore, according to this example, although the processing quantity is less reduced through H/W implementation of one description in a given description part, if its appearance frequency is high, the processing quantity reduced through the H/W implementation is determined to be large.

After carrying out the procedures of steps ST13 through ST16 on all the loop processing parts and functions, the dynamic operation analysis is carried out in step ST27. Specifically, the PC-Trace analysis is conducted by executing S/W and H/W integration simulation, so as to estimate the total processing quantity (number of clock cycles). In this case, differently from the static analysis, it is specifically analyzed through the PC-Trace how many times a given loop processing part or function block is executed. Therefore, the total processing quantity can be highly accurately estimated through the simulation.

Next, in step ST18, when the number of clock cycles necessary for executing all the description parts meets the desired condition (220±5 cycles), the procedure proceeds to step ST19 in the same manner as in the first example, so as to determine a combination of S/W implementation and H/W implementation.

On the other hand, when the number does not meet the desired condition in step ST18, the procedures of steps ST20 through ST24 are carried out in a similar manner to the first example. In this example, for example, when the number of clock cycles is determined to be larger than 220±5 cycles in step ST18, one loop/function having the largest reduced processing quantity is selected from the loop processing parts and functions specified as S/W implementation in step ST22 as a modification loop/function. On the other hand, when the number of clock cycles is determined to be smaller than 220±5 cycles in step ST18, one loop/function having the smallest reduced processing quantity is selected from the blocks specified as H/W implementation in step ST22 as the modification loop/function.

The procedures from step ST23 on are naturally understood from the first example and the above description, and hence, the description is omitted.

According to this example, for example, when the desired condition is, as is shown in FIG. 6($a$), that "the processing quantity (number of clock cycles) is 220±5 cycles", in the case where all the descriptions A, B, C, D and E corresponding to the loop processing parts or functions are S/W implemented descriptions (first case), the total processing quantity (number of clock cycles) is 300 cycles, which does not meet the desired condition. On the other hand, in the case where all the descriptions A, B, C, D and E are converted into H/W implemented descriptions (second case), the total processing quantity (number of clock cycles) is 230 cycles, which does not meet the desired condition although the processing quantity is thus reduced. At this point, in paying attention to the reduced processing quantity of each description part, it is understood that the processing quantity is increased in the descriptions B and D on the contrary through the H/W implementation. This is not found until the simulation is actually carried out. Therefore, when the descriptions A, C and E are implemented by H/W in the initial determination of step ST18 (third case), the total processing quantity (number of clock cycles) is 200 cycles, which is smaller than the desired condition. Therefore, through the procedures of steps ST20 through ST24, the description A whose processing quantity is reduced the largest through the H/W implementation is restored to a S/W implemented description (not shown), and thus, the total processing quantity is increased by 50 cycles than in the third case, and the processing quantity is determined still not to meet the desired condition in step ST18. Then, the procedure returns to step ST20, where the description A is restored again to the H/W implemented description, and the description C whose processing quantity is reduced by the second largest quantity through the H/W implementation is restored to a S/W implemented description (fourth case). Also in this case, the total processing quantity is 230 cycles, which does not meet the desired condition. Furthermore, the procedure returns to step ST20, where the description C is restored to a H/W implemented description, and the description E whose processing quantity is reduced by the third largest quantity through the H/W implementation is restored to a S/W implemented description (fifth case). In this case, the total processing quantity is 220 cycles, which meets the desired condition.

In this manner, according to this example, appropriate S/W and H/W partitioning can be automatically carried out through the simulation at higher accuracy than in the first example. As a result, without being largely affected by the skill of a designer, semiconductor integrated circuit devices with constant and stable quality can be designed.

In each of the first and second examples, as the constraint for determining whether or not a description is apt for H/W implementation, it is possible to determine whether or not the description is apt for, for example, pipelining or parallel processing.

Embodiment 2

In this embodiment, a method (an apparatus) employed for S/W and H/W partitioning by using, as an index, power estimation based on an operation description of each module used in design of an LSI (a semiconductor integrated circuit device including a system LSI) will be described.

When there is an operation description (such as the C language), power consumption is generally estimated by executing simulation. In contrast, in this embodiment, the operation description is subjected to a syntax analysis without conducting simulation, so as to estimate power consumption of each operation or function by calculating power consumption of modules fragmented by a given processing unit or by obtaining the power consumption of modules from a database. Thus, the automatic S/W and H/W partitioning is aided for attaining power consumption meeting a design index. As a result, the number of procedures in performance evaluation of power consumption can be reduced.

In general, power consumption P is calculated by the following formula:

$$P = c \cdot f \cdot V^2 \cdot \alpha$$

In this formula, c indicates line capacitance, which increases as the number of elements increases because the number of lines increases and hence the total line length increases. Therefore, as the number of elements is larger, the capacitance c increases and the power consumption P increases. Also, f indicates an operation frequency, and as the operation frequency is larger, the power consumption P increases. V indicates a supply voltage, and as the supply voltage is lower, the power consumption decreases in proportion to a square of the voltage. $\alpha$ is a switching ratio corresponding to an on/off frequency of a transistor, and as the switching ratio is larger, the power consumption P increases.

Among these parameters, the line capacitance c and the supply voltage V are difficult to extract from the operation description language alone without analyzing details of a circuit such as the layout; In contrast, the switching ratio and the operation frequency f can be extracted from the operation description language.

Power consumption is conventionally estimated through simulation, and this is because data dependence cannot be obtained without the simulation. Specifically, the number of repeating a process may be sometimes varied depending upon a numerical value determined by an operation conducted in executing a program. According to this invention, however, power consumption can be estimated at comparatively high accuracy without conducting the simulation as follows:

In order to reduce unnecessary switching operations in the entire LSI, H/W implementation is employed so as to stop supply of clock when the H/W is not activated. For example, when the use frequency (number of repeating use) of a general operational circuit is larger than a specified threshold value or the operating ratio is larger than a specified threshold value, the operational circuit is implemented by H/W.

Also, a high operation frequency overlaps a large processing quantity. For example, a general operational circuit is implemented by H/W in the case where the use frequency of the general operational circuit is larger than a specified threshold value, the operation frequency of the entire LSI can be lowered through H/W implementation and reduced power consumption is larger than a specified threshold value.

Furthermore, a circuit is implemented by H/W in the case where internal processing can be conducted as a parallel operation, the operation frequency of the circuit can be lowered through H/W implementation and reduced power consumption is larger than a specified threshold value.

First, with respect to lowering of the operation frequency, power consumption can be reduced, even if the operation frequency is lowered, by doubling a processing quantity of one process. For this purpose, a parallel operation is employed in a function. In order to determine whether or not a parallel operation can be employed in a function, dependence between processes in the function is checked. When the processes are independent of each other, the parallel operation can be employed. In this manner, the dependence in a function is analyzed, and a function processed by a parallel operation is implemented by H/W.

Now, specific examples of a S/W and H/W partitioning method and the essential structure of a design apparatus of this embodiment will be described.

Basic Case

Figure 7B:
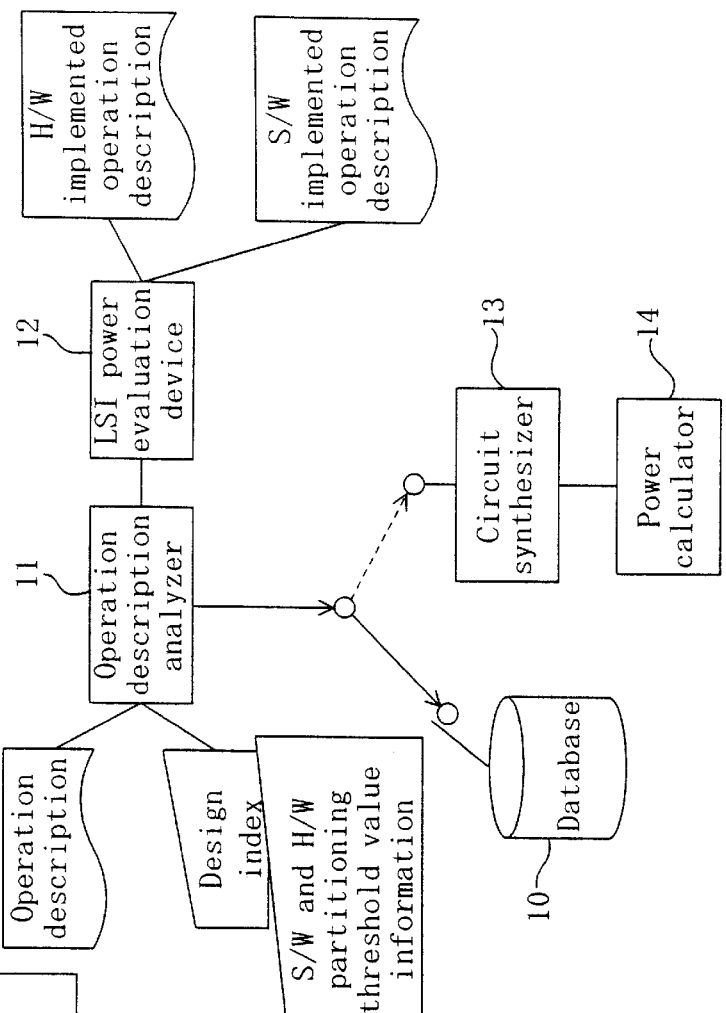
FIGS. 7(a) and 7(b) are a flowchart for showing a software and hardware partitioning method employed in a basic case in Embodiment 2 and a schematic block diagram for showing the structure of a design apparatus used in this case.
Figure 7A:
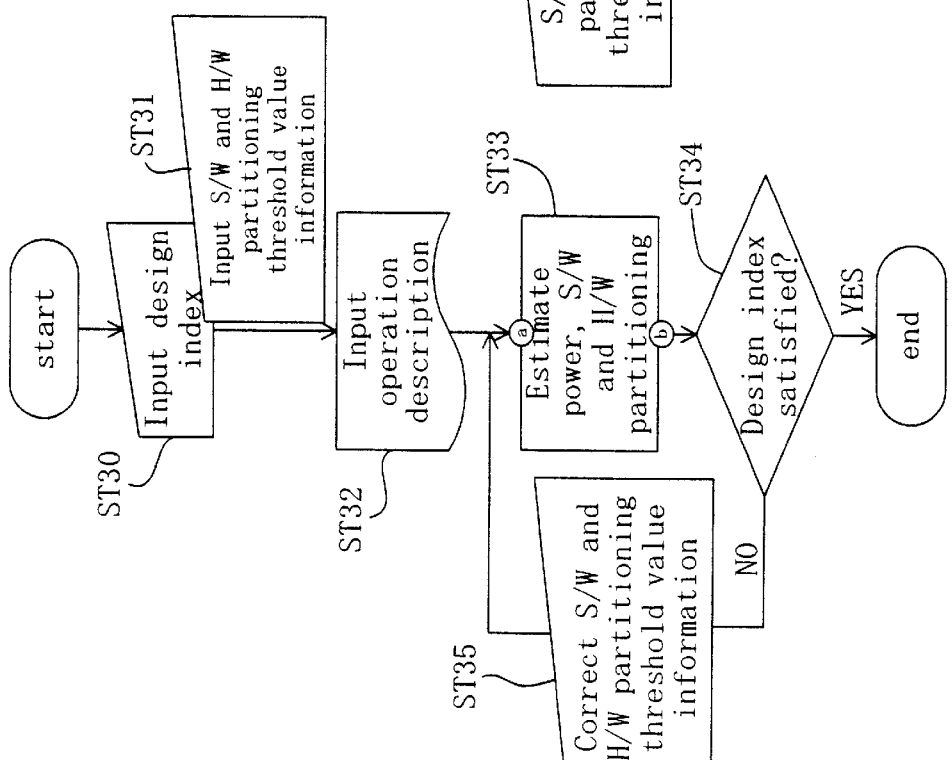

FIG. 7(a) is a flowchart of a basic S/W and H/W partitioning method of this embodiment, and FIG. 7(b) is a block diagram for schematically showing the structure of a design apparatus used in the basic case.

As is shown in FIG. 7(b), the design apparatus used for the basic S/W and H/W partitioning of this embodiment includes a database 10, an operation description analyzer 11, an LSI power evaluation device 12 connected to the operation description analyzer 11, a circuit synthesizer 13, and a power calculator 14 connected to the circuit synthesizer 13. In the case where the database 10 stores no data, the connection of the operation description analyzer 11 is switched to the circuit synthesizer 13 so as to obtain data from the power calculator 14. Also, to the operation description analyzer 11, an operation description, a design index, and S/W and H/W partitioning information can be input. Furthermore, to the LSI power evaluation device 12, a H/W implemented operation description and a S/W implemented operation description can be input.

Next, procedures in the basic S/W and H/W partitioning method of this embodiment will be described according to the flow shown in FIG. 7(a).

First, in step ST30, a design index is input. This is information corresponding to a value (for example, 100 mW) which the power consumption of the entire LSI is desired to be suppressed to. Next, in step ST31, threshold value information used in the S/W and H/W partitioning information is input simultaneously with the input of the design index. This is information on threshold values of various parameters used as references in changing a processing method. A specific method of determining these threshold values will be described in detail later with reference to FIGS. 13(a) and 13(b).

Then, in step ST32, an operation description as a target of the S/W and H/W partitioning is input. This operation description describes, as mentioned above, an operation of each module expressed by the C language or the like.

Next, in step ST33, power consumption is estimated so as to conduct the S/W and H/W partitioning. The method of estimating the power consumption employed in step ST33 will be described in detail later with reference to FIG. 12.

Then, in step ST34, it is determined whether or not the power consumption of the LSI designed as a result of the S/W and H/W partitioning of step ST33 meets the design index.

When the power consumption of the LSI does not meet the design index, the threshold information of the S/W and H/W partitioning is corrected in step ST35, and the procedure returns to step ST33, so as to repeat the procedures of steps ST33 through ST35. When the power consumption of the designed LSI meets the design index, the process is completed.

In this manner, since the S/W and H/W partitioning is automatically conducted so as to reduce the power consumption, the efficiency of designing an LSI with small power consumption can be improved. Therefore, semiconductor integrated circuit devices with constant and stable quality can be designed without being largely affected by the skill of a designer.

In Case of Converting Program for Reducing Power Consumption

FIG. 8(a) is a flowchart of a S/W and H/W partitioning method employed in converting a program for reducing power consumption and FIG. 8(b) is a block diagram for schematically showing the structure of a design apparatus employed in this case.

As is shown in FIG. 8(b), the design apparatus used for the S/W and H/W partitioning in this case includes, in addition to the elements of the aforementioned basic structure, a power reducing program converter 15. Specifically, when an operation description is input to the power reducing program converter 15, the power reducing program converter 15 converts the operation description into an operation description for reducing power consumption, and the resultant operation description is input to the operation description analyzer 11. The rest of the structure is the same as the above-described basic structure.

As is shown in FIG. 8(a), in the procedures in the S/W and H/W partitioning, an operation description is input in step ST42, and it is converted into an operation description for reducing power in step ST43. The power consumption is estimated on the basis of this operation description converted for reducing power. Examples of the operation description for reducing power are a description for reserving a local buffer for enabling a parallel operation, namely, for inserting a local buffer between a main processor and H/W, an algorithm for realizing a DCT operation using multiplication by using addition alone (distributed arithmetic method; DA method), and a description obtained through code conversion.

For example, in using code conversion, data transition can be statically analyzed. Therefore, in the case where there is no data dependence, power consumption is estimated by using not a binary code but a gray code with respect to continuously changing data. An example is shown in FIGS. 9(a) and 9(b).

Figures 9A, 9B:
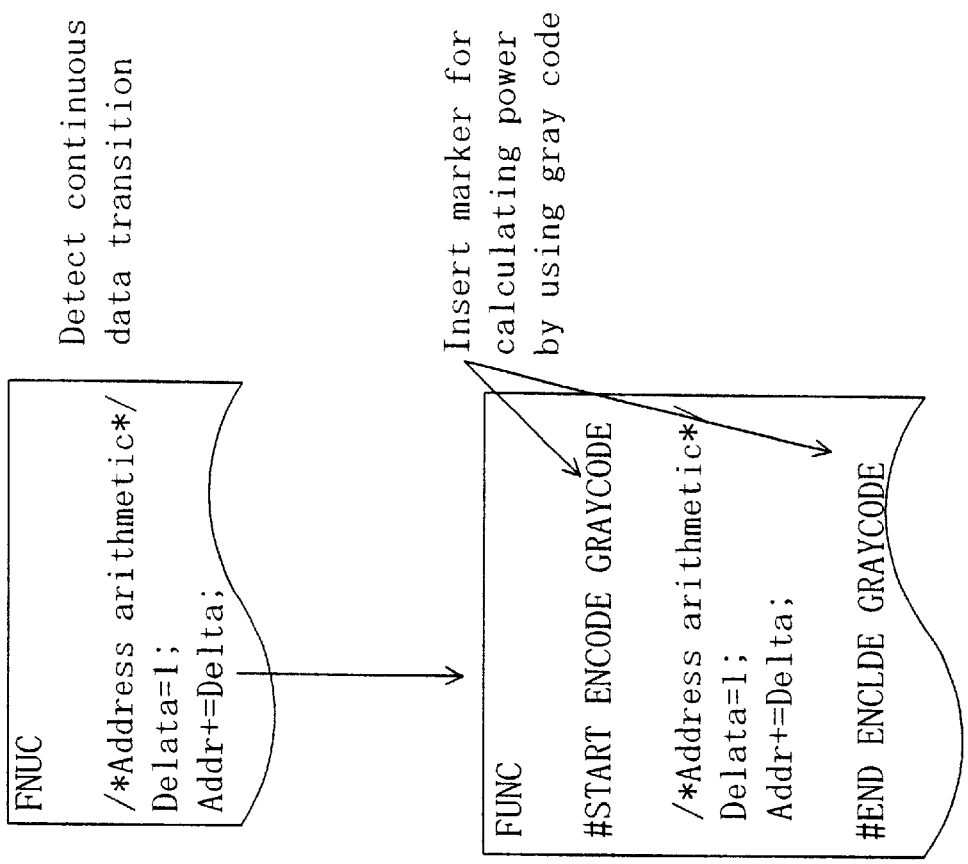
FIGS. 9(a) and 9(b) are diagrams for showing comparison between the number of toggles obtained in using a gray code as the program for reducing power and the number of toggles obtained in using a binary code in Embodiment 2.

FIGS. 9(a) and 9(b) show comparison between the number of toggles (a changed bit number through transition from previous data) obtained by using the gray code as the program for reducing power and the number of toggles obtained by using the binary code. As is shown in FIG. 9(a), as a characteristic in using the gray code, the number of toggles is always 1 bit in continuous change of data. For example, in a 3-bit sequence, the total number of toggles in continuously changing data is 14 bits in using the binary code while the total number of toggles is 8 bits in using the gray code. Therefore, as is shown in FIG. 9(b), a portion where data continuously changes is detected in a given function FUNC, and a marker for calculating power consumption in using the gray code is inserted into the detected portion.

The other procedures are the same as those shown in FIG. 7(a). Specifically, the procedures of steps ST40, ST41, ST42, ST44, ST45 and ST46 of FIG. 8(a) are the same as those of steps ST30, ST31, ST32, ST34, ST35 and ST36 of FIG. 7(a), respectively.

By additionally providing the basic structure with the function to convert a program for reducing power in this manner, the accuracy in the S/W and H/W partitioning can be improved by reducing redundancy. Specifically, even a function that is not determined to be implemented by H/W in the process of step ST33 of FIG. 7(a) of the basic case appears as a function capable of H/W implementation in step ST44 of FIG. 8(a) owing to the program conversion for reducing power.

In Case of Optimizing Power of S/W After Partitioning

Figure 10:
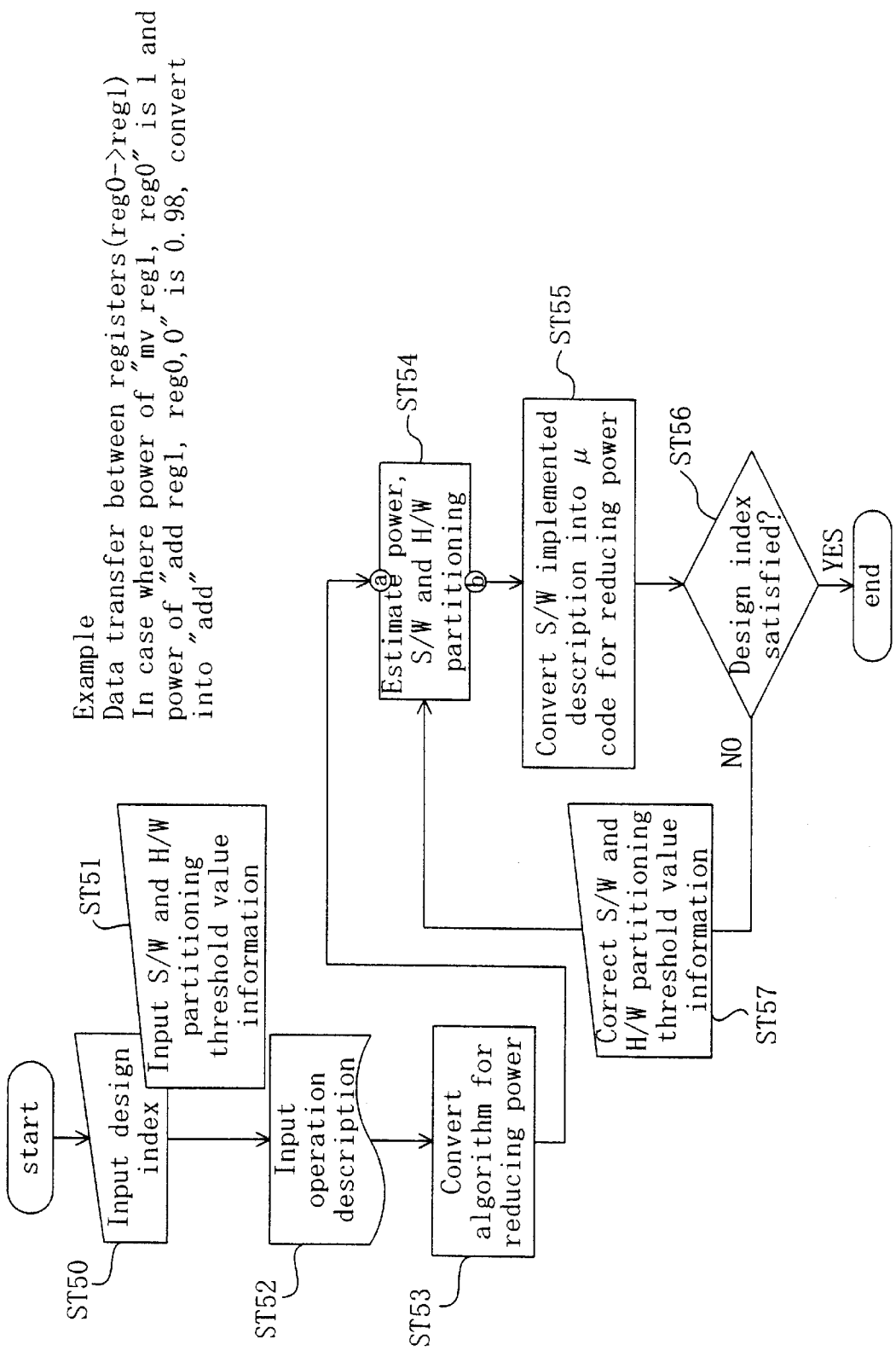
FIG. 10 is a flowchart for showing a software and hardware partitioning method in conducting power optimization after the partitioning in Embodiment 2.
Figure 11:
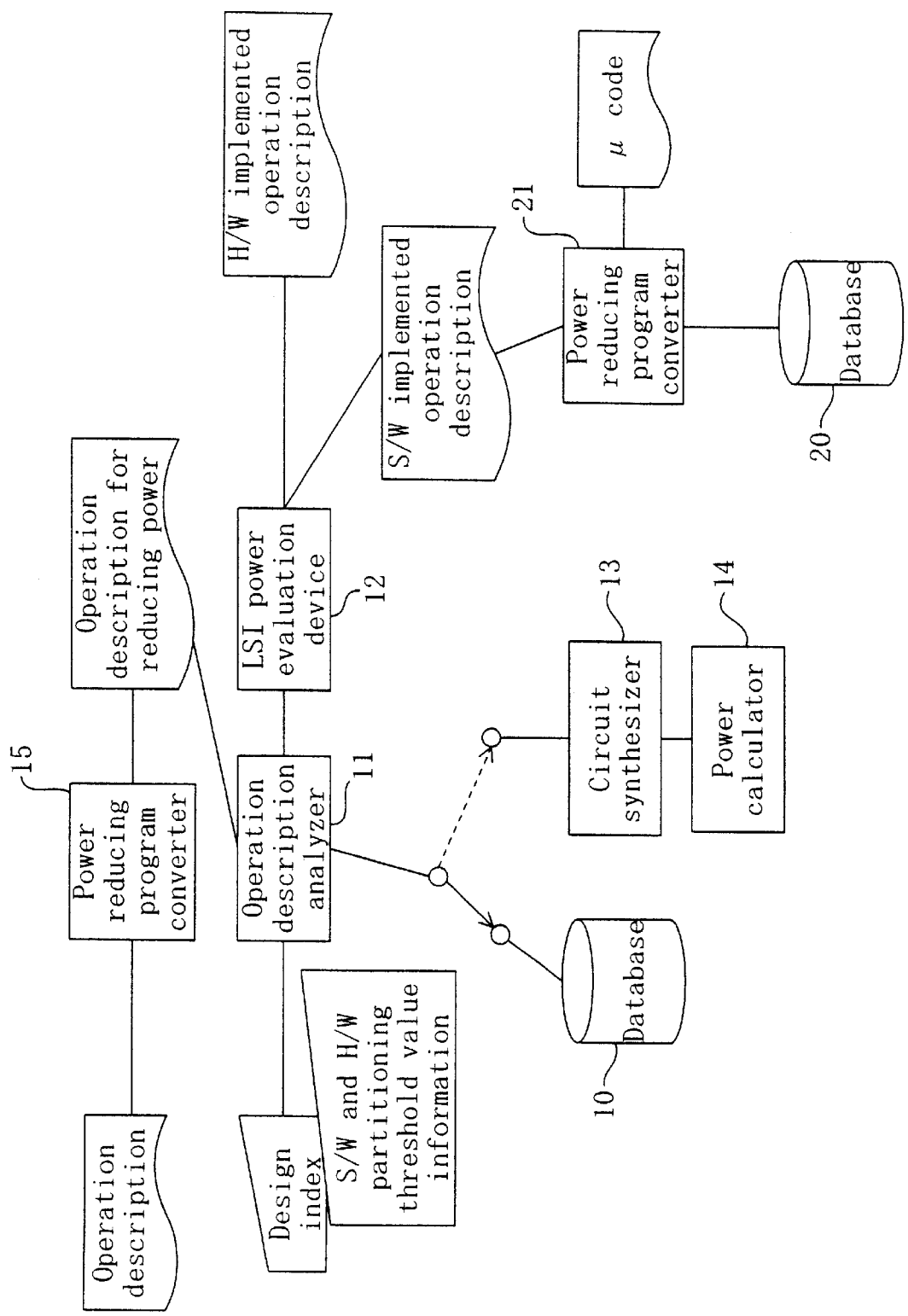
FIG. 11 is a schematic block diagram for showing the structure of a design apparatus used in conducting power optimization in Embodiment 2.

FIG. 10 is a flowchart of a S/W and H/W partitioning method employed in conducting power optimization after the partitioning, and FIG. 11 is a block diagram for schematically showing a design apparatus used in this case.

As is shown in FIG. 11, the design apparatus used for the S/W and H/W partitioning in this case includes, in addition to the elements of the structure of FIG. 8(b), another power reducing program converter 21 and another database 20. Specifically, when a $\mu$ code for S/W implementation is input to the power reducing program converter 21, the power reducing program converter 21 converts the $\mu$ code operation description into a S/W implemented operation description by using the database 20, and the S/W implemented operation description is input to the operation description analyzer 11. The rest of the structure is the same as that shown in FIG. 8(b).

As is shown in FIG. 10, in the procedures of the S/W and H/W partitioning in this case, the above-described estimation result of power consumption is output in step ST54, and the S/W implemented operation description is converted into the $\mu$ code for reducing power in step ST55. Specifically, when an operation description is actually implemented by H/W, the description is converted by a compiler into the $\mu$ code (assembler). At this point, an instruction set at the assembler level is replaced with an instruction set for reducing power. In this manner, the total power consumption of the LSI can be approximated to the design index. For example, in the case where a transfer instruction between registers (mv reg1, . . . ) is an instruction of the assembler, there is another instruction having the same function (add reg, . . . ). In such a case, power consumption is compared between these instructions, and the instruction is converted into the $\mu$ code for reducing power.

On the basis of the converted $\mu$ code, it is determined in step ST56 whether or not the power consumption of the LSI meets the design index.

The other procedures are the same as those of FIG. 9(a). Specifically, procedures of steps ST50, ST51, ST52, ST53, ST54, ST56 and ST57 of FIG. 10 are the same as those of steps ST40, ST41, ST42, ST43, ST44, ST45 and ST46 of FIG. 9(a), respectively.

In this manner, the power consumption can be reduced (optimized) by converting a description into a $\mu$ code and conducting optimization through the converted program. Accordingly, even when the power limit of the design index cannot be attained by H/W implementation alone, the power consumption of the LSI to be designed can be suppressed within the design index by reducing power consumption in a S/W implemented part.

Details of Power Estimation

Next, specific examples of the procedure for estimating power consumption in step ST33, ST44 or ST54 conducted in each of the aforementioned cases will be described.

Figure 12:
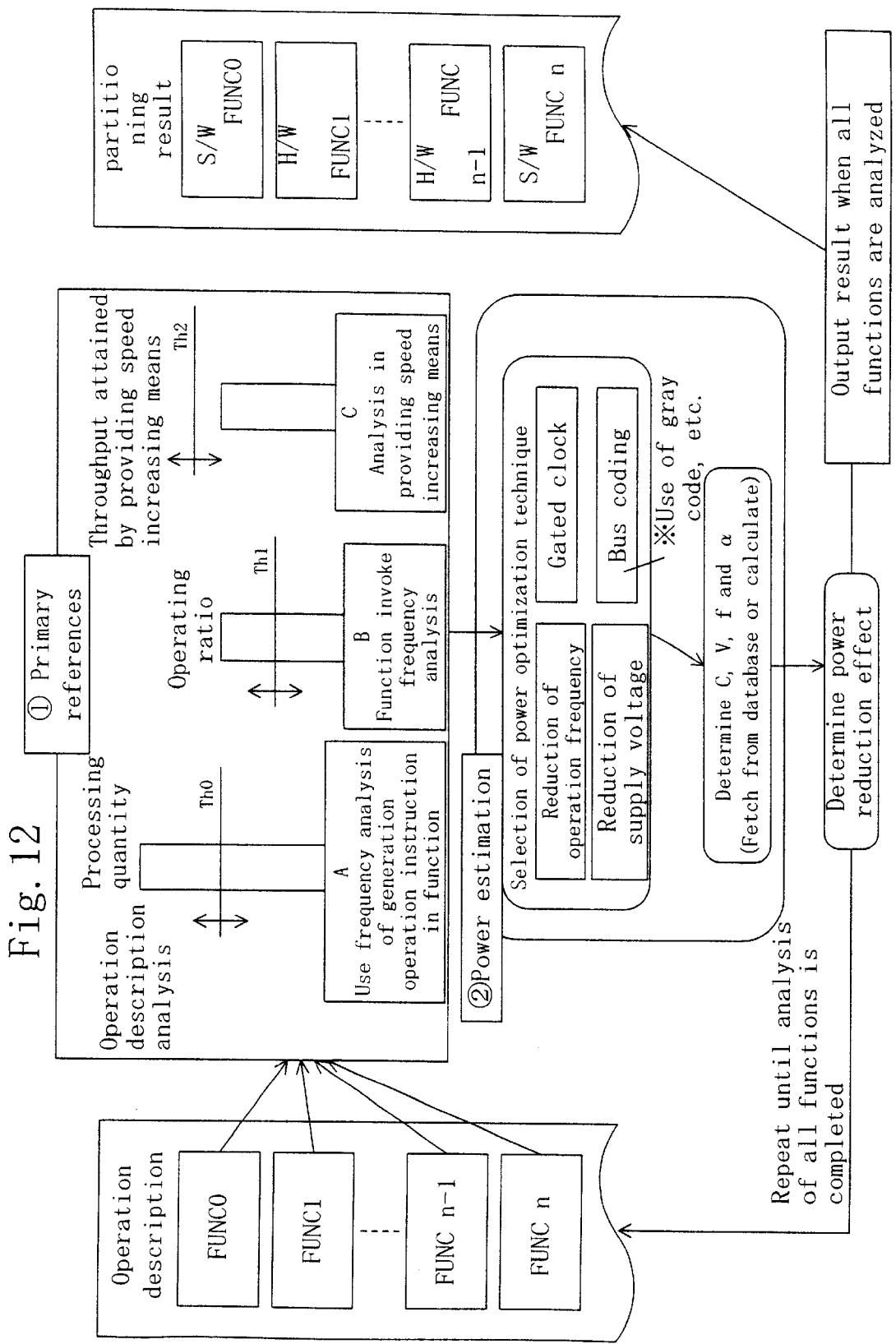
FIG. 12 is a diagram for illustrating procedures in estimation of power consumption in Embodiment 2.

FIG. 12 is a diagram for illustrating the procedures in estimating power consumption in this embodiment. It is assumed that an operation description includes functions FUNC0, FUNC1, . . . , FUNCn-1, and FUNCn. The power consumption is estimated as follows:

① Primary References

First, the use frequency of a general operation instruction in the function is analyzed successively from the function FUNC0. Specifically, the use frequency of the general operation instruction in the function is counted up, and the processing quantity is calculated based on the counted frequency, so as to determine whether or not the processing quantity is larger than a specified threshold value Th0. Also, the operating ratio is calculated by analyzing the use frequency of the function. Specifically, the number of times of the function being invoked in the program is counted up, and the operating ratio is calculated based on the counted number, so as to determine whether or not the operating ratio is larger than a threshold value Th1. Furthermore, in the case where means for increasing the operation speed is provided, the degree of reducing the throughput of the function by the means for increasing the operation speed is calculated, so as to determine whether or not the reduced quantity of the throughput is larger than a threshold value Th2. Also, it may be determined whether or not a vector quantity attained by employing a pipeline operation in the function FUNC is larger than a threshold value for enabling throughput improvement, so as to be used as a reference for determining H/W implementation. In the case where any of the processing quantity, the operating ratio and the reduced quality of the throughput attained by the speed increasing means of a given function FUNC is larger than the corresponding threshold value, the function FUNC is regarded as a target for H/W implementation.

Figure 13:
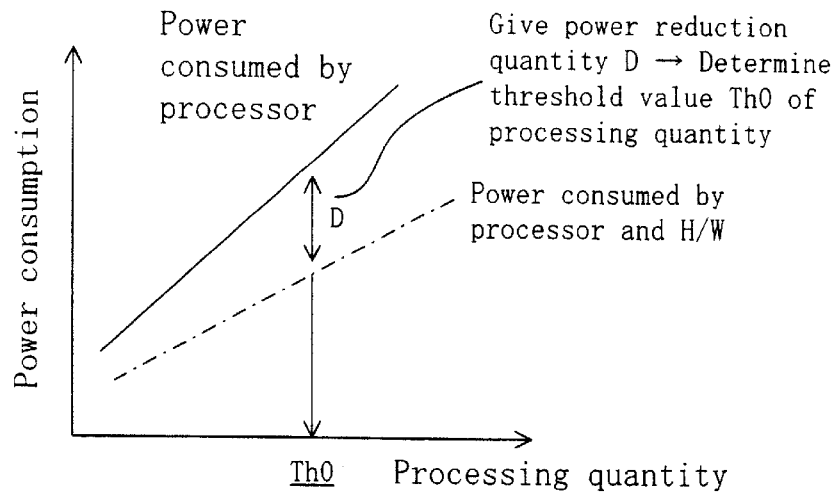
FIGS. 13(a) and 13(b) are diagrams for respectively showing a method of determining a threshold value of a use frequency analysis of a general operation instruction in a function and a method of determining a threshold value of a function invoke frequency analysis in Embodiment 2.
Figure 13:
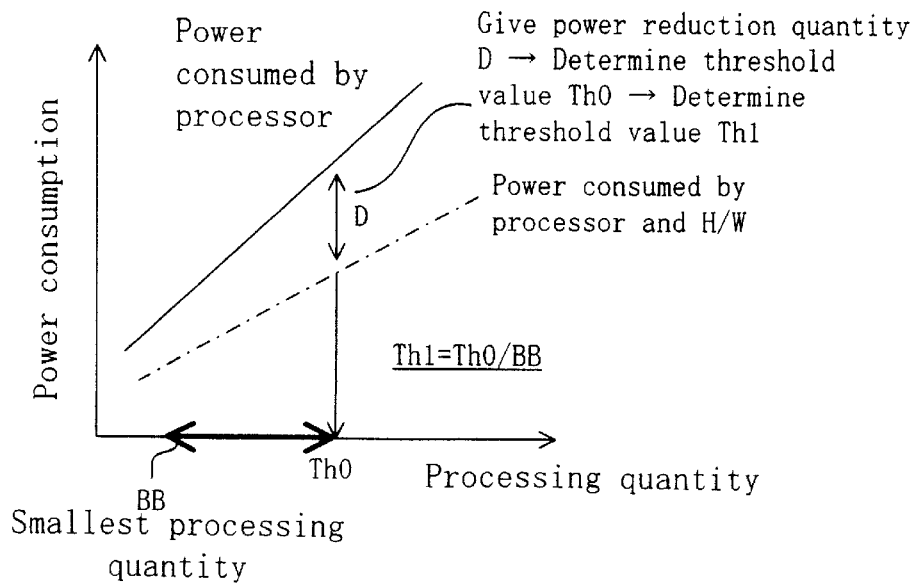

FIGS. 13(a) and 13(b) are diagrams for respectively showing a method of determining the threshold value used in the analysis of the use frequency of the general operation instruction in a function and a method of determining the threshold value used in the invoke frequency analysis of a function. The relationship between the processing quantity and the power consumption is previously prepared. As is shown in FIG. 13(a), the threshold value Th0 of the use frequency of the general operation instruction in a function is determined by setting a desired power reduction quantity D. Also, as is shown in FIG. 13(b), the threshold value Th1 of the invoke frequency of a function is determined as follows: When the threshold value Th0 of the use frequency in the function is determined, the threshold value Th1 used in the invoke frequency analysis is obtained by a formula, Th1=Th0/BB, wherein BB indicates the smallest processing quantity among those of all the functions. In other words, in order to attain the desired power reduction quantity D, the operating ratio should be Th0/BB, which is used as the threshold value Th1.

These threshold values Th0 and Th1 are set to be, for example, reduced in a given proportion every time the procedure returns to step ST35 or ST46 as in Embodiment 1. Thus, the threshold values can be automatically controlled so as to ease unreasonable requirements.

Figure 14A:
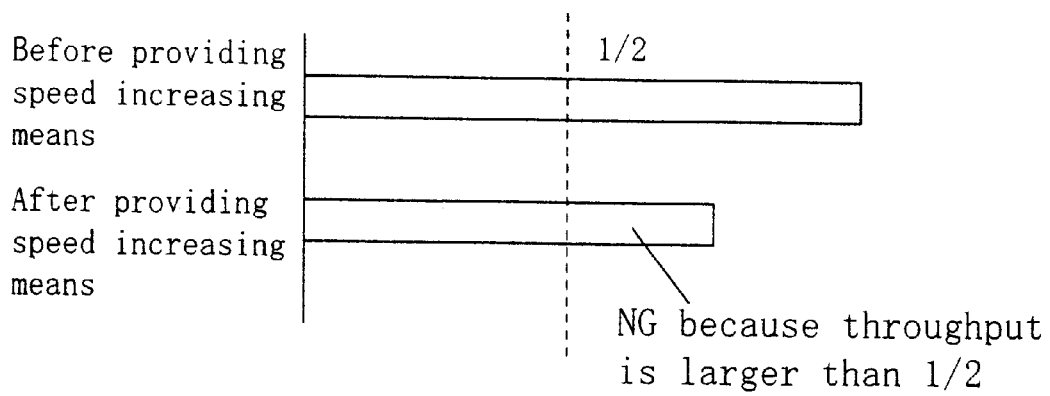
FIGS. 14(a) and 14(b) are diagrams for showing a method of determining a threshold value Th2 used in providing means for increasing an operation speed in Embodiment 2.
Figure 14B:
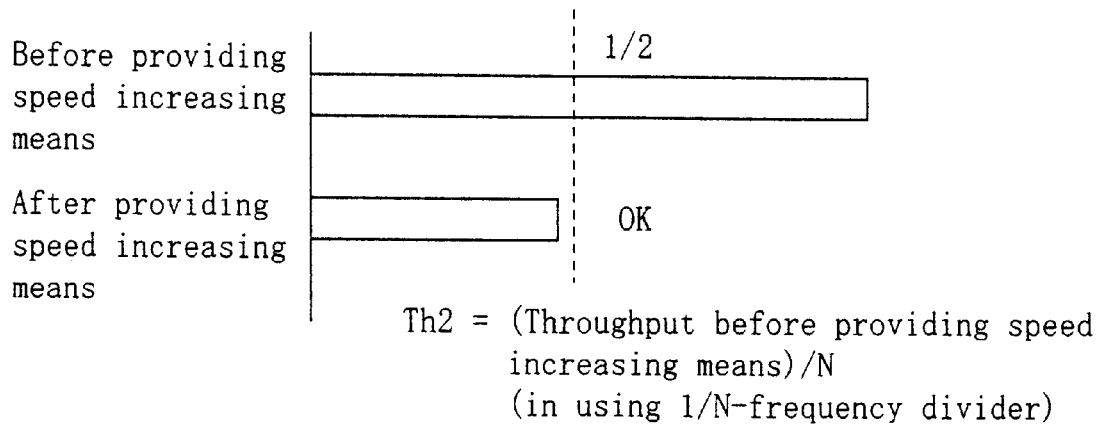

FIGS. 14(a) and 14(b) are diagrams for showing a method of determining the threshold value Th2 used in providing the speed increasing means. In the case where a ½-frequency divider (a circuit for halving the frequency) is used, if the throughput is reduced to ½ or less by providing means for increasing the operation speed (such as a parallel operation or a pipeline operation), the operation frequency of that H/W alone can be halved. Therefore, as is shown in FIG. 14(a), for example, when the throughput attained by providing the speed increasing means is larger than ½ of the throughput attained before providing the speed increasing means, the function is determined as NG. In general, in using a 1/N-frequency divider, when the throughput attained by providing the speed increasing means is smaller than 1/N of the throughput attained before providing the speed increasing means, the function is determined as OK. In other words, the threshold value Th2 of the throughput obtained in providing the speed increasing means is determined in accordance with a formula, Th2=(throughput before providing the speed increasing means/N).

② Power Consumption Estimation

Examples of power optimization technique are reduction of the operation frequency f, employment of gated clock, reduction of the supply voltage and bus coding (whether or not a gray code is used). One of or two or more of these techniques are used for determining the parameters c, V, f and α defining the power consumption P. These parameters c, V, f and α are calculated by using an existing database by supplying the analysis result to the database. In the case where the database does not store power information, the parameters can be calculated by the power calculator shown in FIG. 7(b). Since the power consumed in employing the power optimization can be calculated by calculating the parameters c, V, f and α, a power reduction quantity attained in employing the power optimization can be obtained by calculating a difference between the power consumed in employing the power optimization and the power consumed without employing the power optimization.

Figure 15:
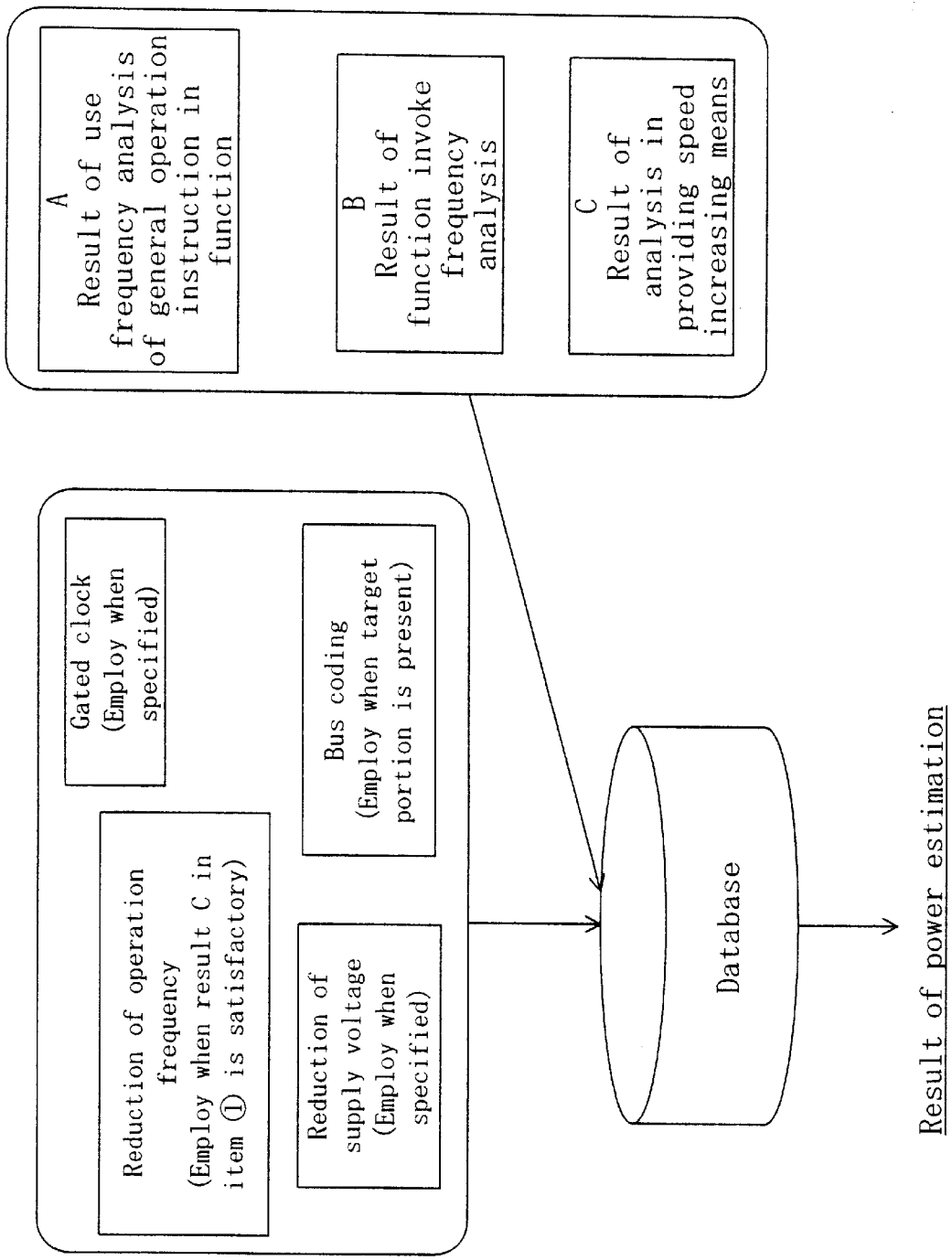
FIG. 15 is a diagram for illustrating a method of selecting a power optimization technique by using an operation description analysis apparatus of Embodiment 2.

FIG. 15 is a diagram for illustrating a method of selecting the power optimization technique by using the operation description analyzer 11 of FIG. 7. One of the power optimization technique is reduction of the operation frequency f as described above, which can be employed when the analysis result obtained in providing the speed increasing means described in the item ① is satisfactory (namely, the reduced quantity of the throughput is smaller than the threshold value Th2). Furthermore, the reduction of the supply voltage and the employment of gated clock are adopted when a designer specifies. The bus coding is employed when a target portion (marker) as is shown in FIG. 9(b) is present. The analysis result A of the use frequency of the general operation instruction in a function, the analysis result B of the invoke frequency of the function and the analysis result C obtained by providing the speed increasing means are input to the database 10, so that the database 10 can output a result of the power estimation.

③ Determination of Power Reduction Effect

When the parameters c, V, f and α are calculated in the aforementioned manner, power P1 consumed in employing the power optimization can be calculated in accordance with the above-described formula, $P=c \cdot f \cdot V^2 \cdot \alpha$. The power reduction quantity resulting from employing the power optimization can be obtained by calculating a difference between the power P1 and power P0 consumed without employing the power optimization. If the power reduction quantity does not exceed a predetermined threshold value, H/W implementation is meaningless. Therefore, when the power reduction quantity exceeds the threshold value, it is determined that the power reduction effect can be effectively exhibited by H/W implementation. When it is determined to be effective, the function FUNC is implemented by H/W, and when not, the function FUNC is implemented by S/W.

The aforementioned procedures (sub-steps) ① through ③ are repeated until the analysis of all the functions FUNC is completed. When the analysis of all the functions FUNC is completed, the analysis result is output. For example, as is shown on the right hand side of FIG. 12, the respective functions are partitioned so as to implement the functions FUNC1 and FUNCn by S/W and implement the functions FUNC1 and FUNCn-1 by H/W. On the basis of the result, it is determined in step ST34 or the like whether or not the power consumption of the LSI designed in accordance with the S/W and H/W partitioning meets the design index.

Figure 16:
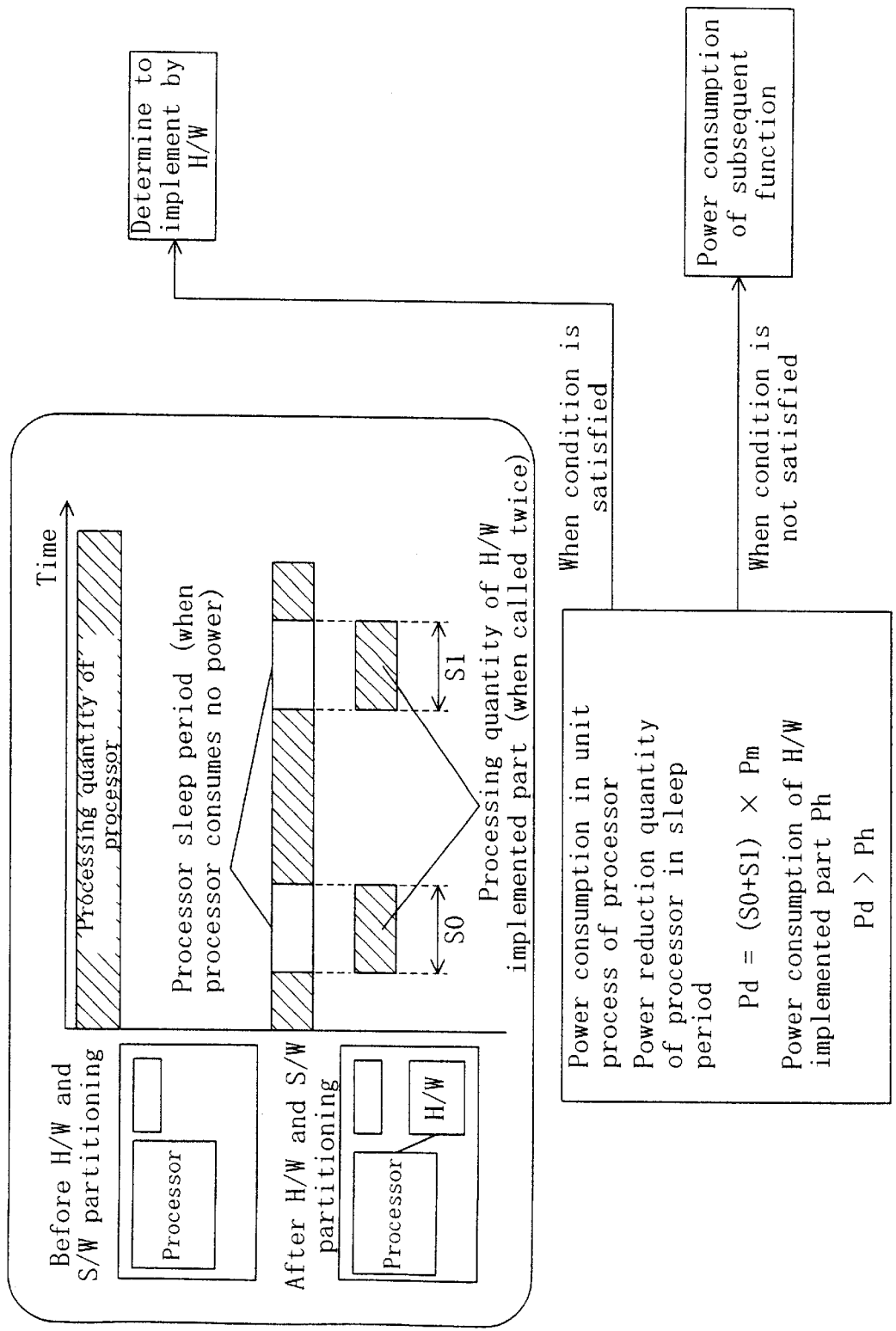
FIG. 16 is a diagram for illustrating a method of determining a power reduction effect in Embodiment 2.

FIG. 16 is a diagram for illustrating a method of determining the power reduction effect used in step ST33, ST44 or ST54. As a result of the S/W and H/W partitioning, the operating time of a processor prior to the S/W and H/W partitioning is partly changed to a sleep period of the processor (when the processor consumes no power) correspondingly to a part implemented by H/W. Therefore, assuming that a H/W implemented part is called twice, the power reduction quantity is estimated based on the processing quantity S0 and S1 of the H/W implemented part. When the power consumption in unit process of the processor is indicated as Pm, the power reduction quantity Pd of the processor resulting from the sleep period is represented as follows:

$$Pd=(S0+S1) \times Pm$$

On the other hand, the H/W implemented part consumes power Ph. Therefore, when Pd>Ph, it is determined that the H/W implementation results in the power reduction effect, so that the function is determined to be implemented by H/W. When the condition of Pd>Ph is not satisfied, the function is not determined to be implemented by H/W, and the power consumption of a subsequent function is estimated.

Embodiment 3

Figure 17:
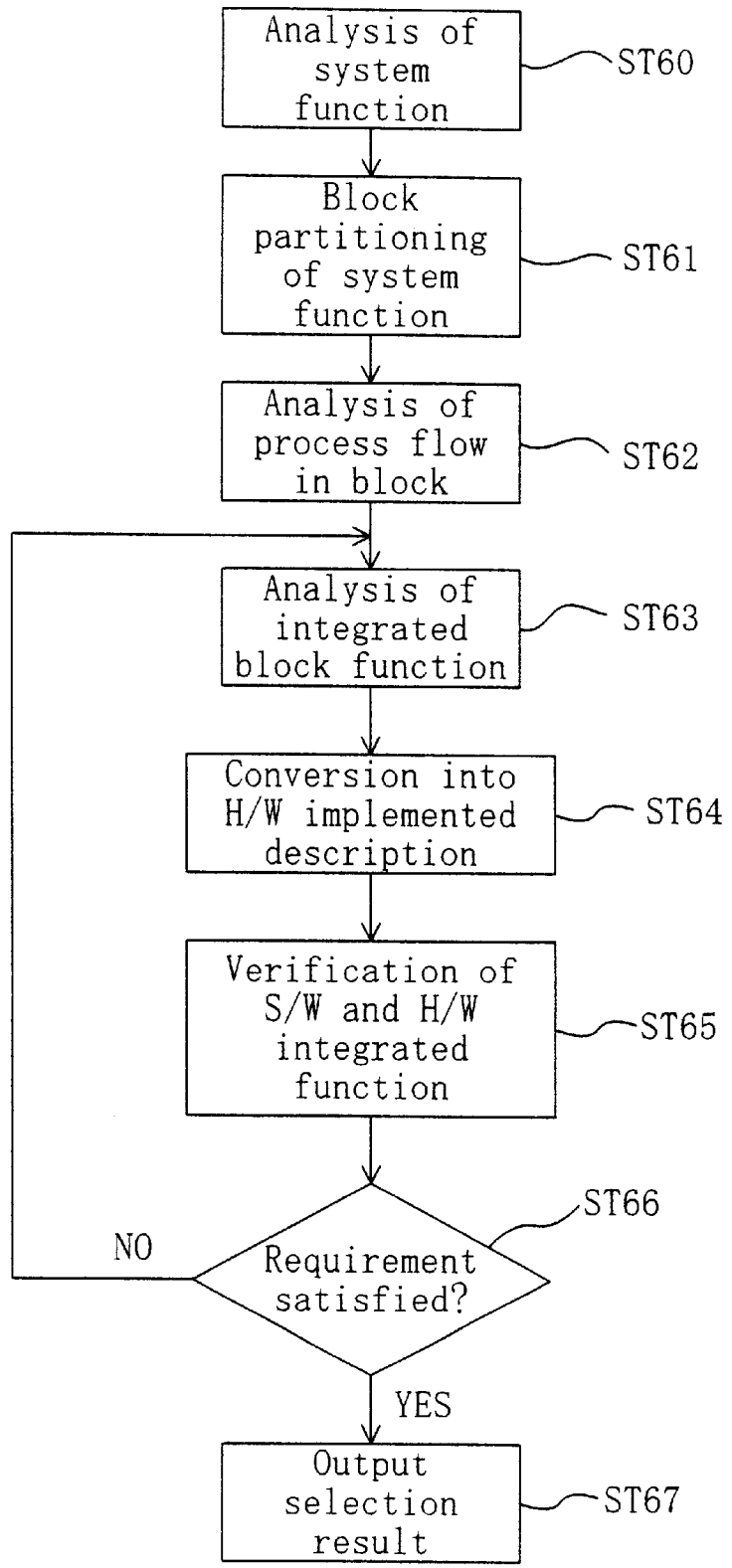
FIG. 17 is a flowchart for showing procedures in software and hardware partitioning according to Embodiment 3.

In this embodiment, S/W and H/W partitioning by using integration of functions with similar process flows will be described. FIG. 17 is a flowchart for showing procedures in the S/W and H/W partitioning of this embodiment. FIGS. 18(a) through 18(c) are diagrams for showing examples of descriptions of functions prior to the integration, and FIG. 19 is a diagram for showing an example of a description of a function resulting from the integration. Now, the procedures in the function integration of this embodiment will be described in accordance with the flow of FIG. 17 with reference to FIGS. 18(a) through 18(c) and 19.

First, in step ST60, operations of a system description language of a semiconductor integrated circuit device to be designed are analyzed, and in step ST61, the system description is partitioned into processing blocks corresponding to respective functions. Specifically, the system description is partitioned into functions func0( ), func1( ), func3( ), func4( ) and the like.

Next, in step ST62, the process flow of each processing block is analyzed. It is herein assumed that the function func0( ) is an 8-bit CRC (cyclic redundancy check) description as is shown in FIG. 18(a), that the function func1( ) is a 16-bit CRC description as is shown in FIG. 18(b), and that the function func3( ) is a 32-bit CRC description as is shown in FIG. 18(c).

Then, in step ST63, similar process flows are combined into one process flow to be treated as one processing block. For example, the functions func0( ), func1( ) and func3( ) of FIGS. 18(a) through 18(c) are different from one another in portions underlined in the drawings (namely, data and data lengths) and the processes can be expressed by using a similar or common description. Namely, these functions have similar flows. Therefore, the three functions func0( ), func1( ) and func3( ) are combined into one function func5( ) as is shown in FIG. 19.

This process is repeated until all similar flows are detected, and then, the system description is partitioned into blocks.

Next, in step ST64, after the block division, processing blocks apt for H/W implementation are extracted to be implemented by H/W. The H/W implementation can be conducted by utilizing the automatic partitioning method described in Embodiment 1 or 2.

Then, in step ST65, integrated functions of S/W and H/W are verified. Thereafter, in step ST66, it is determined whether or not the S/W and H/W partitioning through the block integration can satisfy requirements of a user. When the partitioning satisfies the requirements, the partitioning result is output. Whe n not, the procedures of steps ST63 through ST66 are repeated until the requirements are satisfied. The determination made in step ST66 can be made also by utilizing the method described in Embodiment 1 or 2.

When plural functions having similar flows are integrated into one function in this manner, the number of blocks to be verified can be reduced, resulting in reducing time required for block analysis and verification. In other words, in constructing a system required by a user, optimal S/W and H/W automatic partitioning can be conducted with design time reduced.

Embodiment 4

Figure 20:
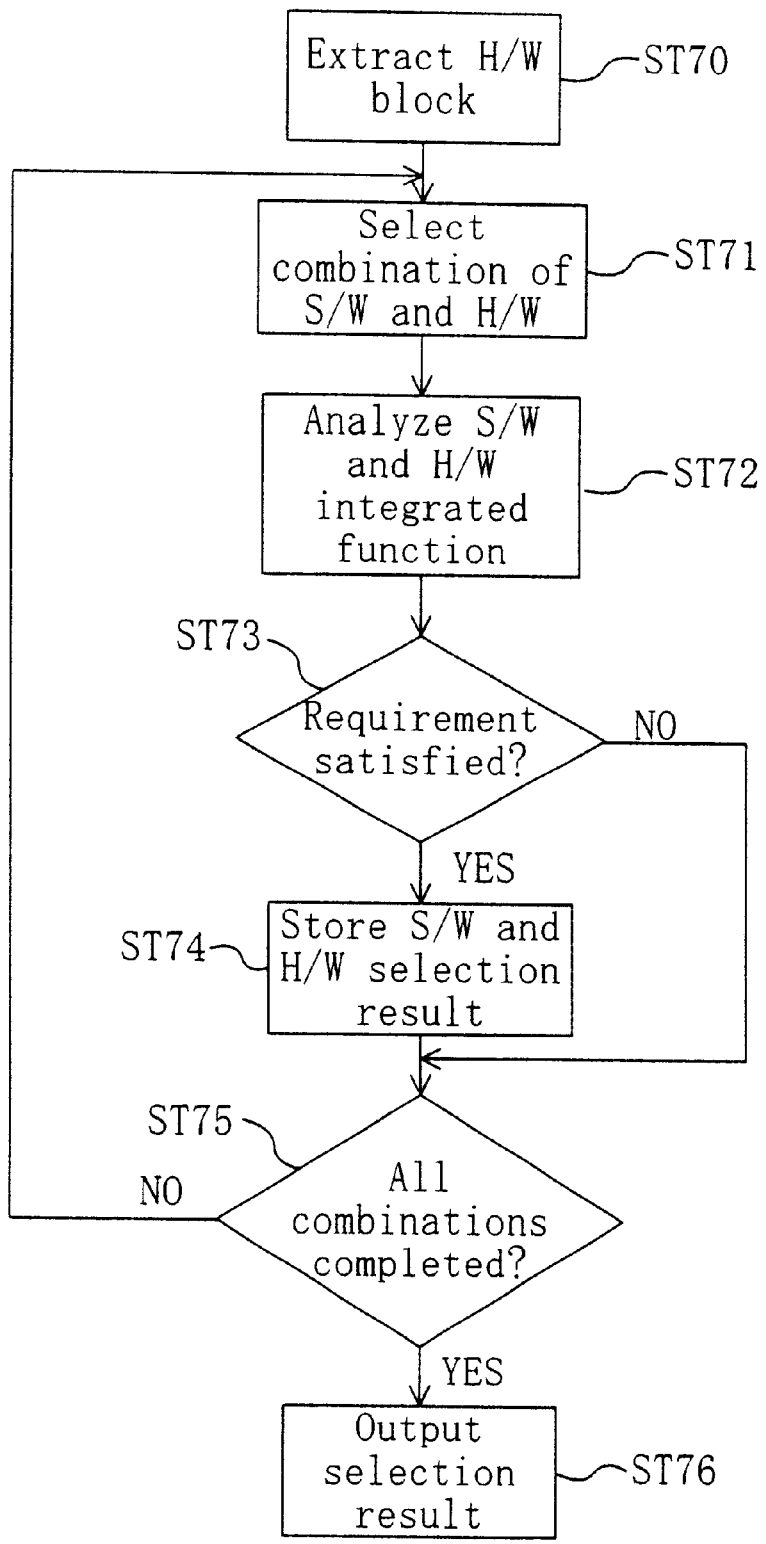
FIG. 20 is a flowchart for showing procedures in software and hardware partitioning according to Embodiment 4.

In this embodiment, a process for designing a semiconductor integrated circuit device in consideration of the trade-off relationship between power consumption and a processing quantity will be described. Specifically, S/W implementation and H/W implementation can be automatically partitioned with the processing quantity (number of clock cycles) and power consumption reduced in Embodiments 1 and 2, and in this embodiment, S/W and H/W partitioning optimal for integrating S/W and H/W on one chip is conducted. FIG. 20 is a flowchart for showing procedures in the S/W and H/W partitioning of this embodiment. FIG. 21(a) is a diagram for showing examples of the processing quantity and power consumption of each function after block division, and FIG. 21(b) is a diagram for showing examples of the processing quantity and power consumption of each function in the first through nth verification. Now, the procedures in the S/W and H/W partitioning of this embodiment will be described in accordance with the flow of FIG. 20 with reference to FIGS. 21(a) and 21(b).

First, in step ST70, among functions func0( ), func1( ), func3( ), func4( ) and func5( ), all blocks (functions) apt for H/W implementation are extracted for block division. This process can be conducted by any of the methods described in Embodiments 1 and 2. At this point, it is herein assumed that the processing quantity and power consumption of the functions func0( ), func1( ), func3( ), func4( ) and func5( ) attained through S/W and H/W implementation are as shown in FIG. 21(a).

Next, in step ST71, a combination of S/W and H/W implementation is selected. Then, in step ST72, the integrated functions of S/W and H/W are analyzed. Specifically, it is herein assumed, as is shown in FIG. 21(b), that conditions, "the processing quantity (number of clock cycles) is 170 cycles or less" and "the power consumption is 170 mW or less", are required as specifications. These conditions are an example adopted in laying stress on the processing quantity. Then, simulation is carried out with combinations of S/W implemented parts and H/W implemented parts of the respective functions selected as shown with hatchings in the first verification, the second verification and the nth verification of FIG. 21(b).

Then, in step ST73, it is determined whether or not both the processing quantity and the power consumption obtained by each combination meet the required specifications. When the specifications are satisfied, the combination is stored in a database as the selection result of S/W and H/W implementation. On the other hand, when it is determined in step ST73 that the specifications are not satisfied, the procedure returns to step ST71, and the procedures of steps ST71 through ST75 are repeated until the determination in step ST75 of all the combinations is completed. In the examples shown in FIG. 21(b), a combination satisfying the required specifications is obtained in the nth verification.

When the verification of all the combinations is completed, the procedure proceeds to step ST76, where the selection result is output.

The procedure may proceed to step ST76 when one combination satisfying the specifications is found in the verification of step ST73. However, the method of this embodiment is advantageous in selecting the most preferable combination.

In this manner, with respect to all combinations of S/W and H/W implementation of every function, a combination satisfying the required specifications of both a processing quantity and power consumption is extracted in consideration of the trade-off relationship between the processing quantity and the power consumption of a semiconductor integrated circuit device to be designed. As a result, S/W and H/W implementation can be optimally partitioned so as to satisfy requirements of a user.

Embodiment 5

In this embodiment, improvement of an analysis function of a simulator used in design of a semiconductor integrated circuit device (LSI) will be described.

For example, in the case where large memory capacity is required for realizing operations of the LSI, it is difficult to reserve a memory with the necessary capacity within the LSI, and hence, an external memory is utilized. In reading data by accessing an external memory, however, large power is consumed. Therefore, when small capacity is necessary, merely registers reserved within the LSI suffice. In this embodiment, in order to detect such a portion with wasteful power consumption, an instruction set simulator is provided with a function to analyze power consumption. Now, two specific examples for realizing the power reduction of this embodiment will be described.

Herein, an "instruction set simulator (ISS)" is a simulator for conducting simulation in accordance with instructions of a program. For example, in conducting simulation of a given microcomputer, the instruction set simulator is aggregate of software having functions to conduct the same operations as the microcomputer.

FIRST EXAMPLE

Figure 22A:
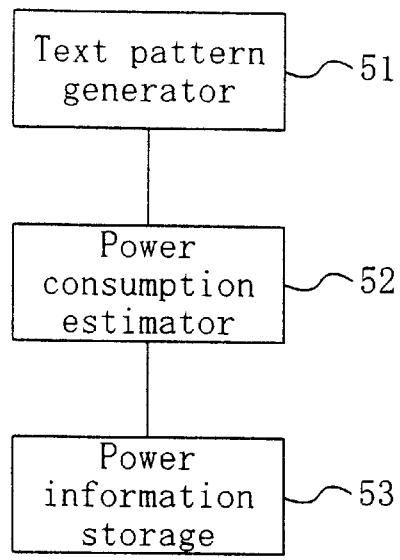
FIGS. 22(a) and 22(b) are schematic block diagrams for showing the structures of power analysis systems of first and second examples of Embodiment 5, respectively.

FIG. 22(a) is a block diagram for schematically showing the structure of a power analysis system of this example. In this example, an instruction set simulator is not necessarily used. As is shown in FIG. 22(a), the power analysis system functioning as the instruction set simulator includes a test pattern generator 51 for generating a test pattern for power analysis, a power consumption estimator 52 and a power information storage 53. A test pattern of each instruction set generated by the test pattern generator 51 is analyzed by the power consumption estimator 52, and the result of the analysis is stored in the power information storage 53. The power analysis system of this embodiment is not necessarily required to function as the instruction set simulator.

In the test pattern generator 51, a sufficiently large number of programs are generated so as not to cause an error. With respect to a data line of a register, a test pattern set where respective bits are successively inverted is used for estimation. The power of a memory is estimated with respect to each of a write operation and a read operation.

Thus, a power value of data transition in each register, a power value of each instruction and a power value of memory transfer are obtained.

FIGS. 23(a) and 23(b) are diagrams for illustrating a method of analyzing power consumption of a specific instruction of a description in a given program. Actually, these drawings illustrate the operation of the test pattern generator 51.

A source program A describes an instruction for executing an operation for alternately setting a data "0" and a data "0" in a register FR0 (namely, 0-bit transition) 10000 times. This instruction is input to the instruction set simulator, and the power estimated by the power consumption estimator 52 is assumed to be power Wa.

On the other hand, a source program B describes an instruction for executing an operation for alternately setting a data "0" and a data "3" in the register FR0 (namely, 2-bit transition) 10000 times. Specifically, 0-to-3 transition and 3-to-0 transition are repeated 10000 times in total in this instruction. This instruction is input to the instruction set simulator, and the power estimated by the power consumption estimator 52 is assumed to be power Wb. As a characteristic of a CMOS device, power consumption of a register is caused by transition of a data (1-to-0 transition or 0-to-1 transition). For example, in using a gray code, transition from "0" (0000) to "3" (0011) corresponds to a bit transition number of "2".

Then, the power consumption estimator 52 calculates power P in accordance with a formula below.

$$P = (Wb - Wa)/(2 \times 10000)$$

The power P corresponds to power consumption truly necessary for causing 2-bit transition in the register FR0. The reason is as follows:

Although no data transition is caused in the source program A, the microcomputer includes a large number of blocks, and some blocks not related to data input/output are simultaneously operated. Accordingly, power consumed as background (noise) by executing the 10000 operations of the source program A is obtained as the power Wb. A value obtained by subtracting the power Wb from the power Wa corresponds to power consumed by repeating the 2-bit transition 10000 times. Accordingly, the power P truly consumed in the 2-bit transition with noise eliminated can be obtained by the aforementioned formula. Similar power analysis is conducted with respect to data change of 1-bit transition, 3-bit transition, etc., so that the relationship between the bit transition number accompanied by data change in the register and the power consumption can be obtained. Alternatively, power consumed in each bit transition of a register can be approximately obtained by multiplying power consumption of unit bit transition of the register by a bit transition number accompanied by data change.

Then, the power consumption estimator 52 stores the analysis result in the power information storage 53 as power information. FIG. 24(c) described later shows an example of the power information stored in the power information storage 53.

In this example, power consumed by data change in a register can be accurately analyzed by using an instruction set simulator or the like. Specifically, by using both a test pattern including an instruction for repeating an operation for causing transition between "N" and "0" in a register plural times and a test pattern including an instruction for repeating an operation for causing transition between "0" and "0" in the register the same number of times as is shown in FIGS. 23(a) and 23(b), power truly consumed in data change (bit transition) in the register can be obtained with background noise eliminated.

Although an example of the calculation of power consumed in data change in a register is described in this example, the example is applicable to calculation of power consumed in a memory.

SECOND EXAMPLE

Figure 22B:
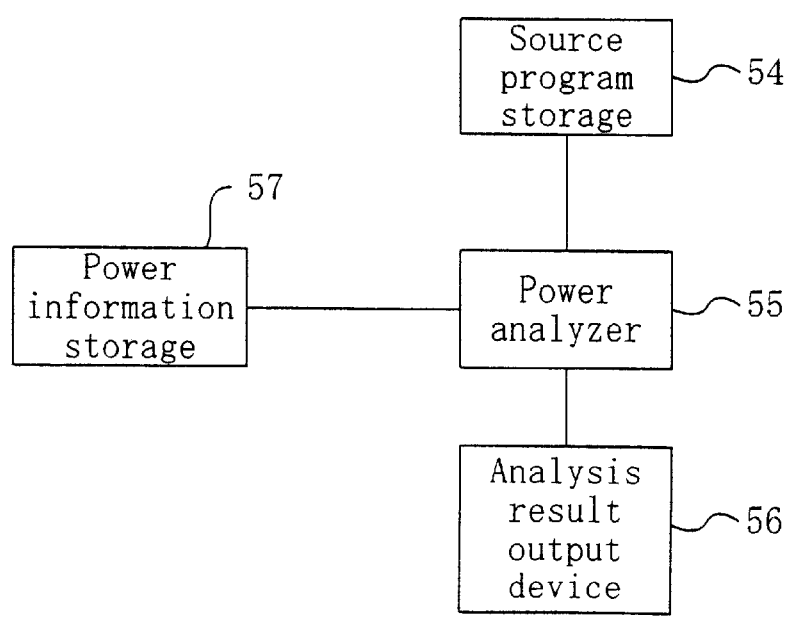

FIG. 22(b) is a block diagram for schematically showing the structure of a power analysis system of the second example. The power analysis system of this example functions as an instruction set simulator, and includes a source program storage 54, a power analyzer 55, an analysis result output device 56 and a power information storage 57. The power analyzer 55 analyzes a source code output from the source program storage 54 in accordance with power information of each instruction stored in the power information storage 57, and outputs the analysis result to the analysis result output device 56.

When an instruction code "ADD" is input from the source program storage 54, the power analyzer 55 reads power values corresponding to the instruction code "ADD" and its operation result from the power information storage 57. This process is executed with respect to all source programs, and the results are output through the analysis result output device 56. Then, in addition to power estimation of each instruction, power consumption is analyzed with respect to data transition.

FIGS. 24(a) through 24(c) are diagrams for showing a source program stored in the source program storage 54, and power information A and B stored in the power information storage 57, respectively.

As is shown in FIG. 24(*a*), instructions for executing respective operations are described in the source program. A power consumption value of each instruction, namely, a value of power consumed by executing each instruction, is registered in the power information A. The power value is shown as a standardized value in the drawing for simplification but is actually registered as a value of $\mu$W order. A power consumption value of each register is registered in the power information B. As the power information 2, for example, a table of the relationship between the bit transition number and the power consumption obtained by using test patterns in the first example is stored.

FIGS. 25(*a*) through 25(*c*) are diagrams for respectively showing the instructions included in the source program, the procedures of the power analysis and the analysis result.

When, for example, there is an instruction "SET FR2, 2" (an instruction for registering a data "2" in a file register FR2) as is shown in FIG. 25(*a*), the power consumption of the instruction "SET" is found to be 1 on the basis of the power information A of FIG. 24(*b*). Also, the power consumption of "change from FR2 (0000) to FR (0010)" (1-bit transition) is found to be 0.2 on the basis of the power information B of FIG. 24(*c*). Accordingly, the power consumption of this instruction is obtained as 1.2 as the analysis result. Similarly, the power consumption of an instruction "SET FR1, 0" is 1.0, the power consumption of an instruction "ADD FR1, FR1, FR2" is 3.2, and the power consumption of an instruction "MUL FR3, FR1, 2" is 20.2. By executing such a program as simulation, the power consumed in executing each instruction of the program can be calculated.

The power consumption thus obtained is output from the power analyzer 55 through the analysis result output device 56.

In particular, by providing an instruction set simulator with the function to estimate power consumption according to this embodiment, a process (instruction or register) consuming large power in the circuit to be designed can be rapidly detected, so as to provide means for reducing the power consumption.

THIRD EXAMPLE

In this example, power consumption is obtained through dynamic simulation, and a program is changed so as to reduce a portion consuming large power in the program.

Figure 26:
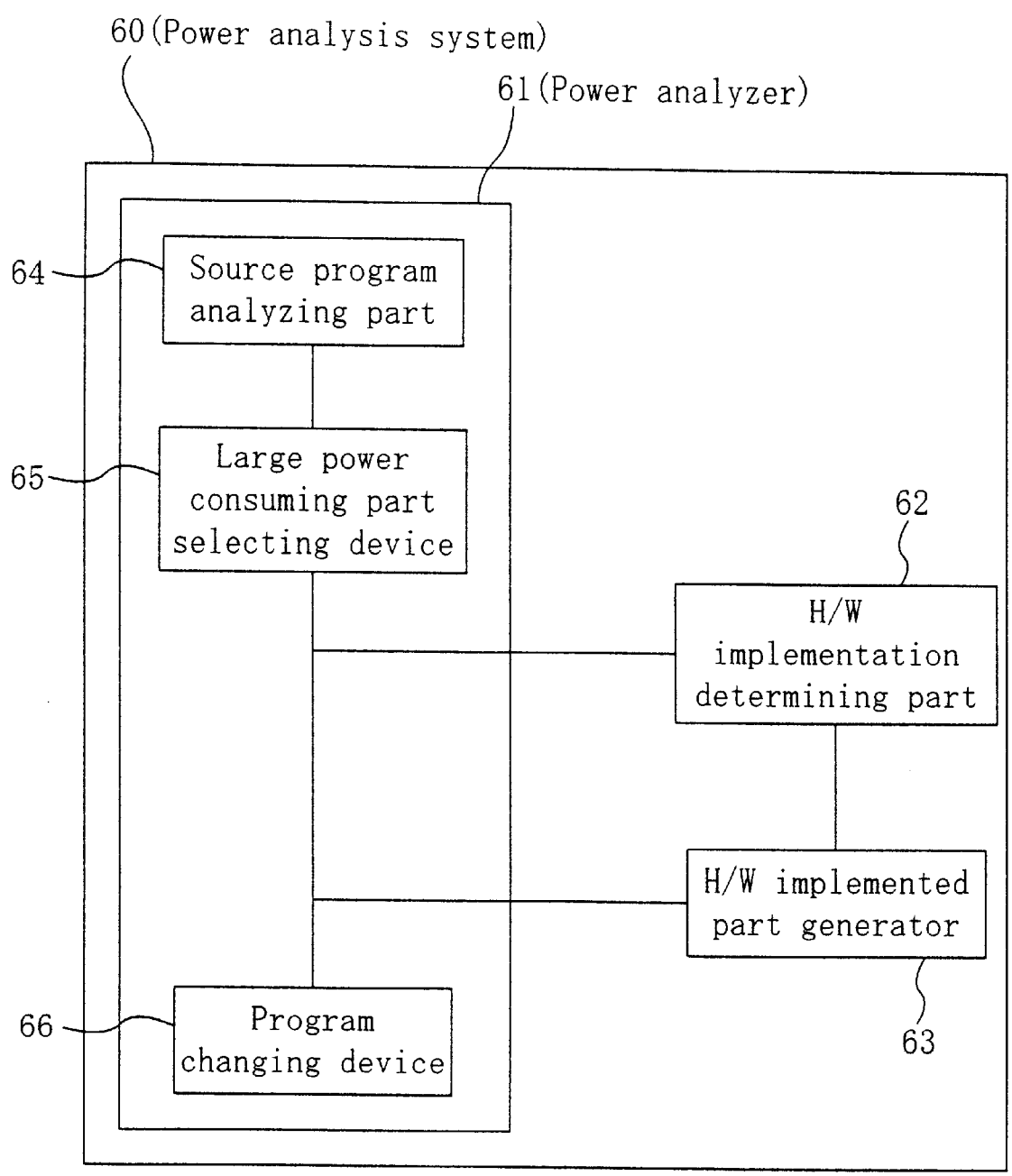
FIG. 26 is a block diagram for schematically showing the structure of a power analysis system of a third example of Embodiment 5.

FIG. 26 is a block diagram for schematically showing the structure of a power analysis system of the third example. The power analysis system 60 of this example includes a power analyzer 61, a H/W implementation determining part 62 and a H/W implemented part generator 63. The power analyzer 61 includes a source program analyzing part 64, a large power consuming part selecting device 65 and a program changing device 66. In the power analyzer 61, the source program analyzing part 64 partitions a program into instruction codes and data, so as to analyze power consumption of all source programs. The large power consuming part selecting device 65 selects and outputs an instruction code in a step (at least one step) consuming large power based on a power analysis value, so that the selected instruction code can be replaced with an instruction set consuming smaller power by the program changing device 66.

FIGS. 27(*a*) through 27(*c*) are tables for respectively showing a power analysis result, the power information and a power analysis result obtained after changing the program in this example. As is shown in FIG. 27(*a*), it is understood, as a result of the dynamic simulation, that a process "MUL FR3, FR1, 2" (on line number 1012) consumes the largest power among respective processes. In this case, this process is treated as a specified process, and attention is paid to a portion "FR1, 2" (to multiply a data of a register FR1 by 2) of the specified process. According to the power information shown in FIG. 27(*b*), the power consumption of a multiplication instruction "MUL" is 20, which is much larger than the power consumption of other instructions. On the other hand, when this multiplication instruction is replaced with a shift instruction for shifting a data of the register FR1 leftward by 1 bit, the same processing function can be attained. Therefore, the process is changed to another process "SFT FR3, FR1, 1" (on line number 1012) by replacing the multiplication instruction with the shift instruction as is shown in FIG. 27(*c*). As a result, the power consumption of the process including the shift instruction (on line number 1012) is 3.2, and thus, the power consumption can be reduced. In this manner, a specific process to be selected for power reduction can be easily detected by previously setting a threshold value, and the power consumption can be reduced by automatically changing instructions.

FOURTH EXAMPLE

Figures 28A, 28B, 28C:
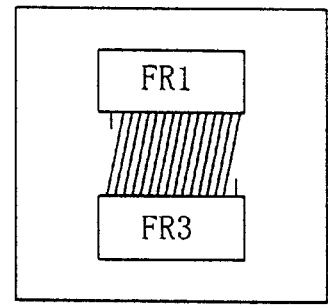
FIGS. 28(a), 28(b) and 28(c) are diagrams for respectively showing a power analysis result, a generated hardware circuit and a result of change of a program in a fourth example of Embodiment 5.

In this example, the power analysis system 60 of FIG. 26 is used similarly to the third example. In this example, a program is changed not by using software but by using hardware. FIGS. 28(*a*) through 28(*c*) are a table for showing the power analysis result, a generated H/W circuit and a table for showing the result of changing a program in this example. As is shown in FIG. 28(*a*), an instruction "MUL FR3, FR1, 2" (multiplication instruction) consumes the largest power among instructions as in the third example. At this point, also in this example, the portion "FR1, 2" (to multiply a data of the register FR1 by 2) of this multiplication instruction is replaced with an instruction for shifting the data of the register FR1 leftward by 1 bit as in the third example. In this example, however, software is not changed but a H/W circuit as is shown in FIG. 28(*b*) is generated. Specifically, as is shown in FIG. 28(*b*), the register FR1 and a register FR3 are connected through buses shifted by 1 bit. Thus, the multiplication instruction "to multiply by 2" is replaced with an instruction to call the H/W circuit as is shown in FIG. 28(*c*). As a result, the power consumed in using the H/W circuit is 2.2, and thus, the power consumption can be reduced. The power consumption value of 2.2 of the instruction "CALL H/W" shown on line number 1012 of FIG. 28(*c*) is obtained by conducting the analysis by using the power analyzer and feeding back the result to the database again. Primarily, the power consumption value of the instruction "CALL H/W" of FIG. 28(*c*) is unknown. If the value is left unknown, the power value of the line number 1012 is not taken in as a data, and hence, the processing may be proceeded with the value unknown. Therefore, the generated H/W circuit has a hardware analysis tool for estimating power consumption, and the power consumption is estimated by the tool, so that the resultant value can be incorporated. This process may be conducted manually or automatically.

Also, in a part thus implemented by hardware, a distinguishably abnormally large value, such as 100, can be set for informing abnormality. In this case, abnormality is informed during the simulation, and hence, a H/W implemented part is automatically detected by such an abnormal value. Therefore, the simulator can automatically estimate the power consumption to be stored in the table.

Embodiment 6

Figure 29:
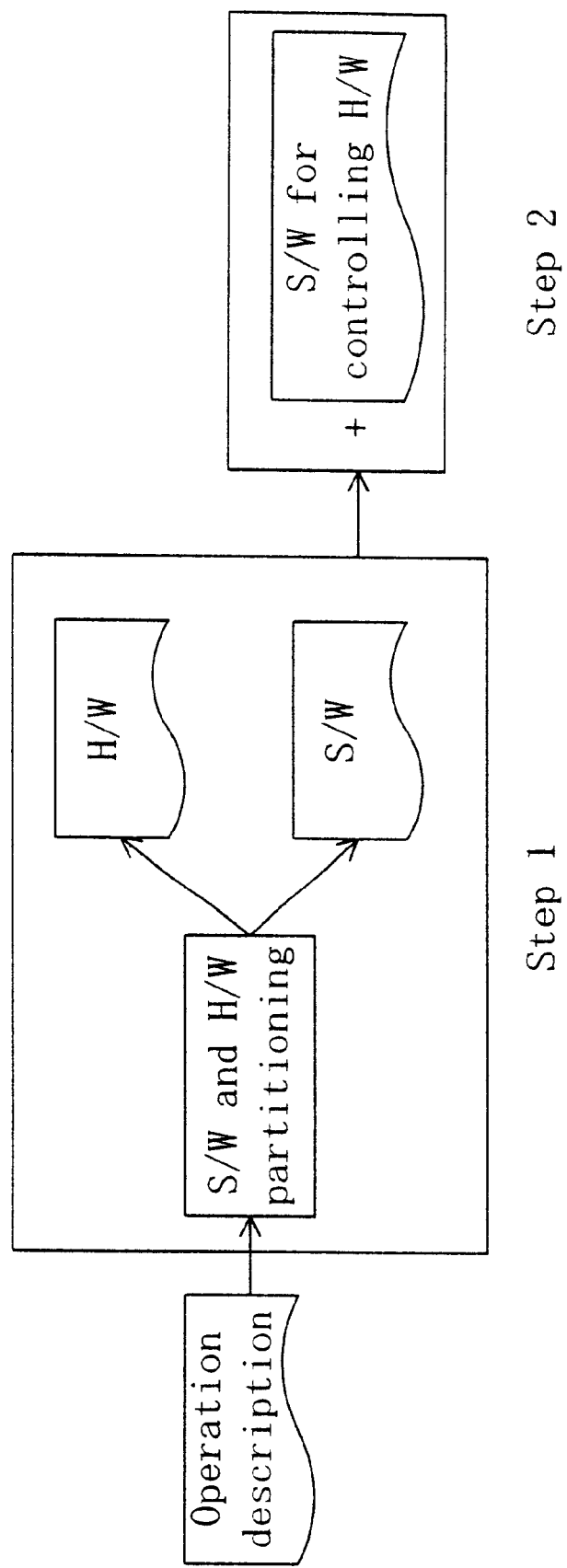
FIG. 29 is a block diagram for showing a method of generating a conventional interface between software and hardware.

In this embodiment, automatic generation of an interface between S/W and H/W employed in the S/W and H/W partitioning in design of a semiconductor integrated circuit device will be described. FIG. 29 is a block diagram for showing a conventional method of generating an interface between S/W and H/W. Now, the conventional method of generating an interface between S/W and H/W will be described with reference to FIG. 29.

First, in a step 1, an operation description corresponding to a part describing an operation of a system is taken out from a database, and the operation description is manually partitioned between S/W implementation and H/W implementation by a designer. Thus, the operation description is partitioned between a H/W part to be executed by hardware and a S/W part executed by software on a processor. Then, in a step 2, the designer generates an interface S/W part for controlling the H/W part partitioned in the step 1 and for inputting/outputting data between a processor and the H/W part, and inserts the interface S/W part into the S/W part partitioned in the step 1.

In the conventional method, however, two manual steps are required for partitioning the operation description into S/W and H/W implementation. The problems occurring due to the manual operation in the step 1 are already described. Also, in manually conducting the step 2, a problem of a design mistake occasionally occurs in particular.

Therefore, in this embodiment, two specific examples of the method of automatically generating an interface between S/W and H/W to be used in the automatic S/W and H/W partitioning according to any of the aforementioned embodiments will be described.

FIRST EXAMPLE

Figure 30:
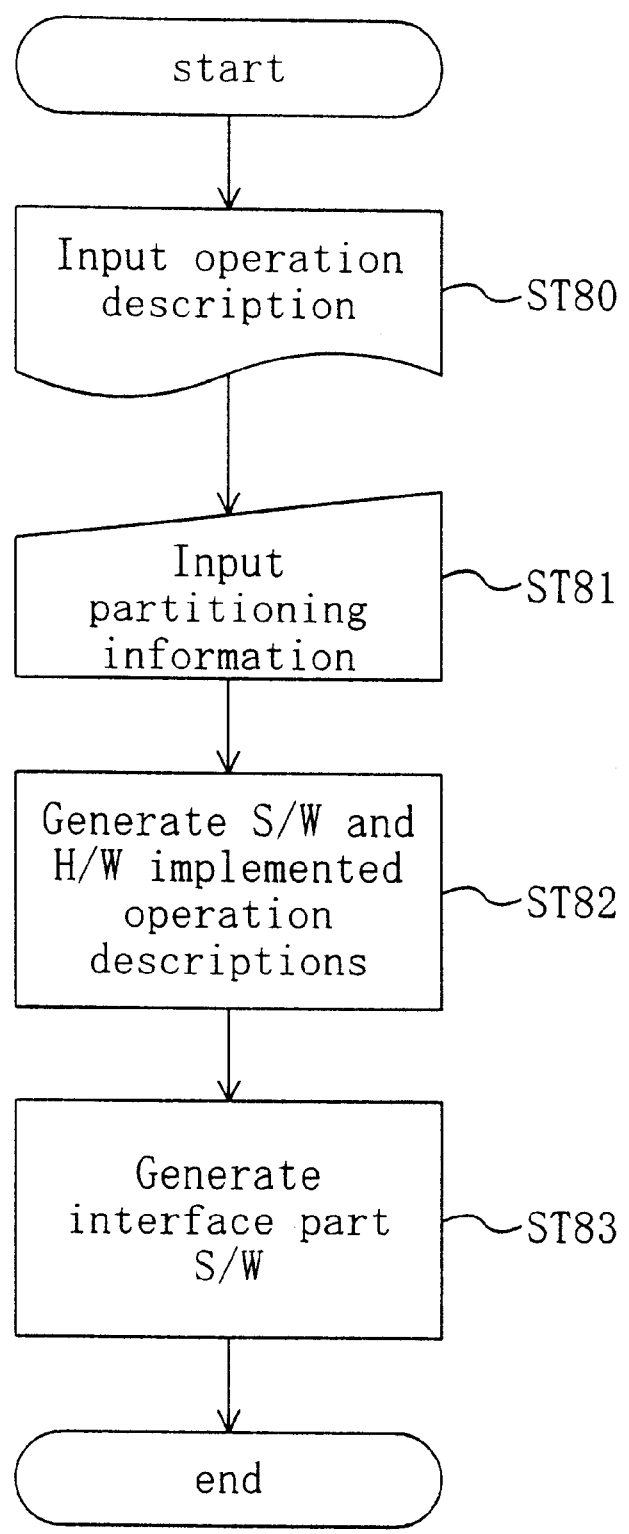
FIG. 30 is a flowchart for showing procedures in automatic generation of an interface between software and hardware in a first example of Embodiment 6 of the invention.
Figure 31:
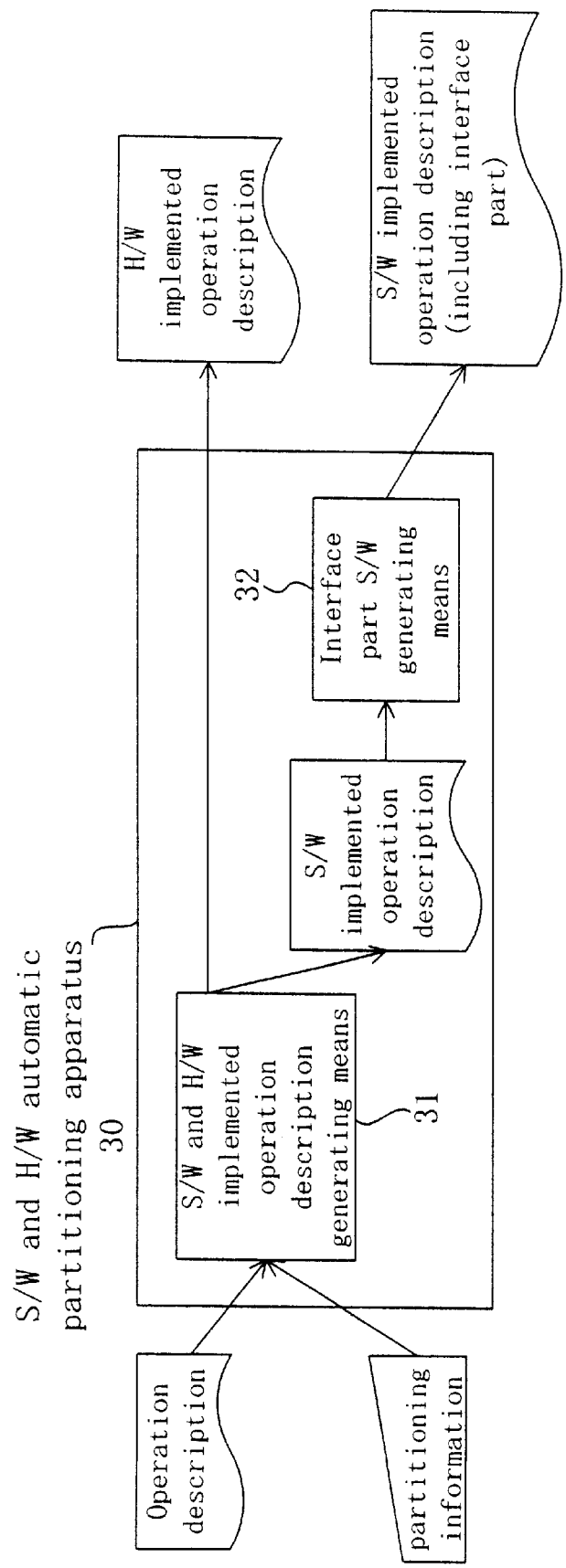
FIG. 31 is a block diagram for schematically showing the structure of a design apparatus of the first example of Embodiment 6.

In this example, a method of automatically generating an interface between S/W and H/W on the S/W side will be described. FIG. 30 is a flowchart for showing procedures in the automatic generation of an interface between S/W and H/W of this example. FIG. 31 is a block diagram for schematically showing the structure of a design apparatus of this example. FIGS. 32(*a*), 32(*b*), 33(*a*) through 33(*d*), and 34 through 36 are diagrams for showing examples of operation descriptions and the like appearing in the respective procedures of the flow of FIG. 30.

As is shown in FIG. 31, the S/W and H/W automatic partitioning apparatus of this example includes S/W and H/W implemented operation description generating means 31 and interface part S/W generating means 32. An operation description and partitioning information are input to the S/W and H/W implemented operation description generating means 31, so as to dividedly generating a H/W implemented operation description and a S/W implemented operation description. Furthermore, the S/W implemented operation description is input to the interface part S/W generating means 32, so as to generate a S/W implemented operation description including an interface part.

The input operation description is S/W for describing operations of a system by, for example, the C language. The partitioning information is information regarding a partitioning range for partitioning between a H/W part where the operation description is implemented by H/W and a S/W part where the operation description is implemented by S/W on a processor. For example, in the case where the operation description is S/W for describing functions main, func1 and func2 by the C language, the partitioning information is information that the function func2 is implemented by H/W and that the other functions main and func1 are implemented by S/W. This partitioning information may be manually generated, or calculated and determined on the basis of some index as in the automatic partitioning described in any of the aforementioned embodiments.

In the ultimately generated S/W implemented operation description, input/output of data between a processor and the H/W part and interface part S/W for determining end of the process by the H/W part are added.

Now, the procedures in the automatic generation of an interface of this example will be described in accordance with the flow of FIG. 30 with reference to FIGS. 32(*a*), 32(*b*), 33(*a*) through 33(*d*) and 34 through 36.

First, in step ST80, an operation description is input, and in step ST81, partitioning information is input. FIG. 32(*a*) is a diagram for showing an example of the operation description input in step ST80. Specifically, the operations of functions main, func1 and func2 are described by the C language. Also, FIG. 32(*b*) is a diagram for showing an example of the partitioning information input in step ST81. In the partitioning information of this example, the functions main and func1 are implemented by S/W and the function func2 is implemented by H/W.

Next, in step ST82, a S/W implemented operation description and a H/W implemented operation description are dividedly generated on the basis of the operation description and the partitioning information. FIGS. 33(*a*) through 33(*d*) are diagrams for showing examples of the operation description, the partitioning information, the S/W implemented operation description and the H/W implemented operation description, respectively. Specifically, the functions main and func1 are described by the S/W implemented operation description and the function func2 is described by the H/W implemented operation description.

Figure 34:
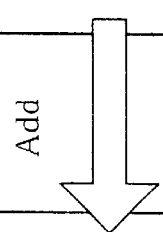
FIG. 34 is a diagram for showing a process for adding interface part S/W to a software implemented operation description generated in the design flow of the first example of Embodiment 6.

Then, in step ST83, interface part S/W is added to the S/W implemented operation description. FIG. 34 is a diagram for showing a process for adding the interface part S/W to the S/W implemented operation description generated in step ST82. The interface part S/W includes description regarding definition of activation and termination codes of a H/W part, definition of a H/W local memory region, transfer of input data to the H/W local memory, activation of the H/W part, termination wait for the operation of the H/W part and fetch of the operation result of the H/W part.

Figure 35:
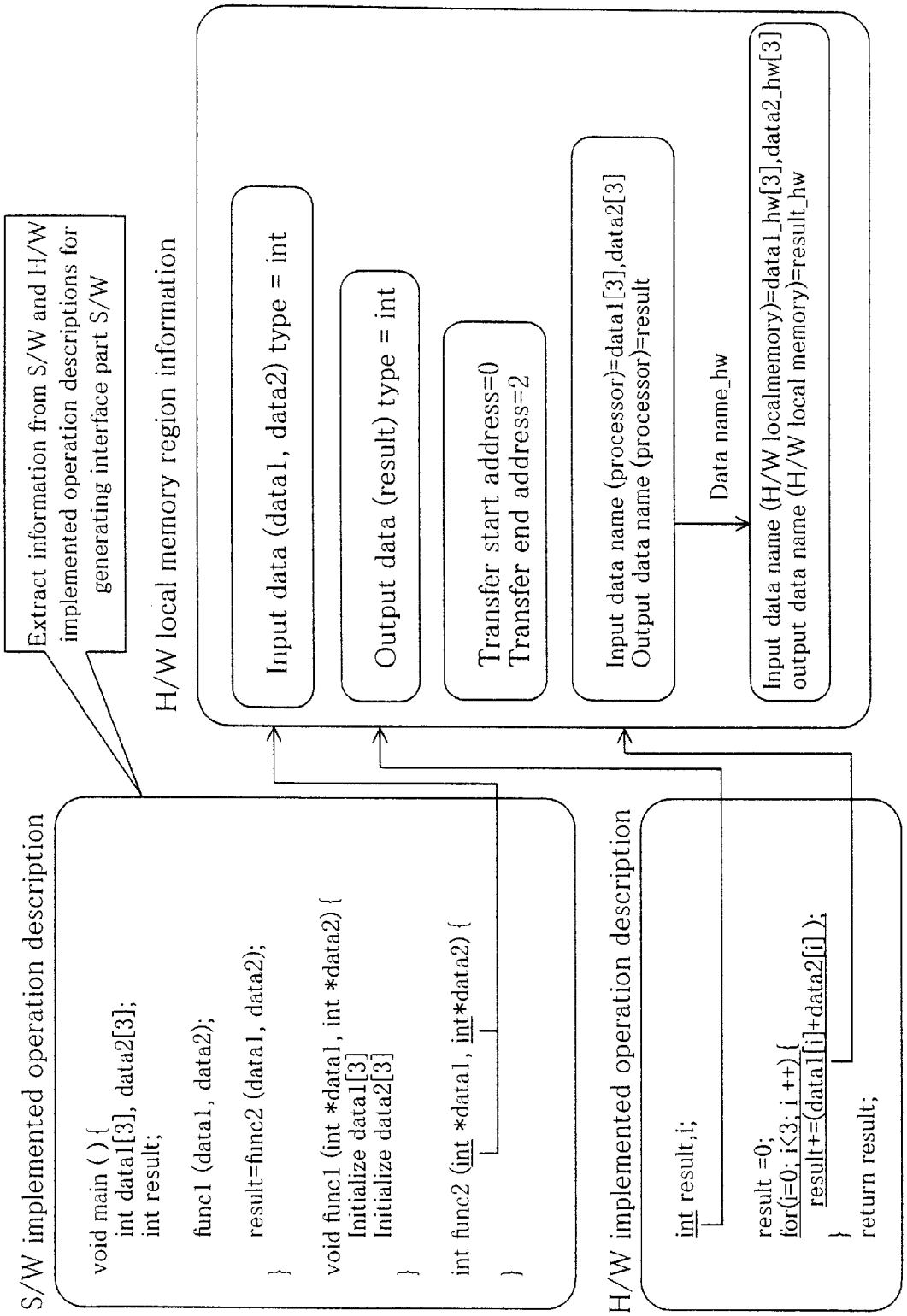
FIG. 35 is a diagram for showing procedures in automatic generation of hardware local memory region information in the design flow of the first example of Embodiment 6.

FIG. 35 is a diagram for illustrating procedures in automatically extracting the H/W local memory region information at this point. As is shown in FIG. 35, based on underlined portions of the S/W implemented operation description and the H/W implemented operation description generated in step ST82, the H/W local memory region information is generated. Specifically, as the local memory region information, an input data (data1, data2) type, an output data (result) type, a transfer start address "0", a transfer end address "2", an input data name of a processor and an output data name of the processor are extracted. Then, a description regarding the input data name and the output data name of the H/W local memory is generated.

Figure 36:
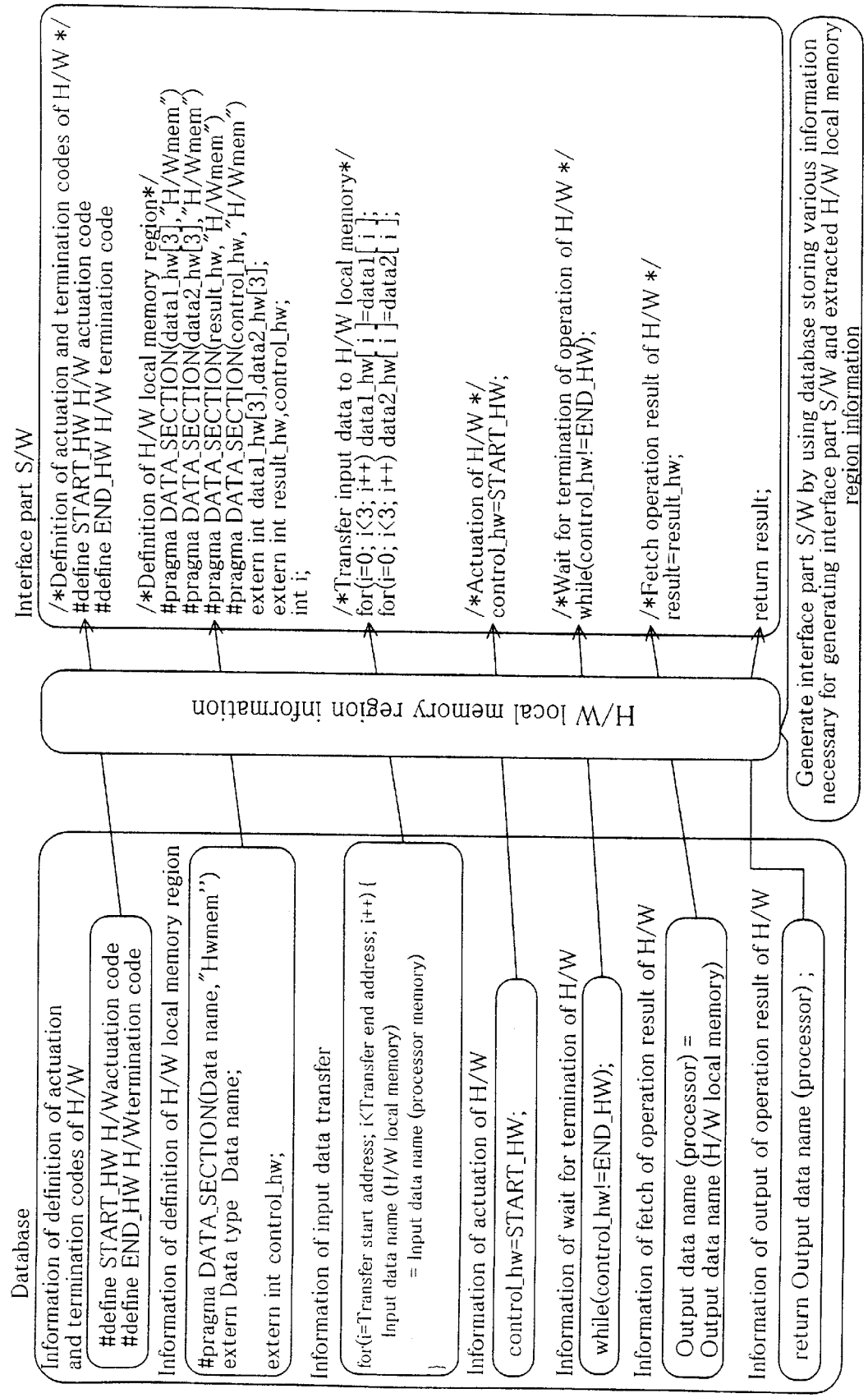
FIG. 36 is a diagram for illustrating a method of automatically generating the interface part S/W by using a database and the hardware local memory region information in the design flow of the first example of Embodiment 6.

FIG. 36 is a diagram for illustrating a method of automatically generating the interface part S/W by using a database and the H/W local memory region information. The database stores descriptions regarding definition information of activation and termination codes of the H/W part, definition information of the H/W local memory region, input data transfer information, H/W activation information, H/W termination wait information, H/W operation result fetching information and H/W operation result outputting information. The interface part S/W is automatically generated by using these descriptions and the extracted H/W local memory region information. For this automatic generation, it is necessary to extract, from the operation description, the input data name, the output data name, and transfer start address and transfer end address corresponding to information on which part of input/output data is to be transferred between the H/W part and the processor.

Therefore, references for extracting these information from the input operation description will be described in detail with reference to FIG. 35.

First, the input data name is extracted, for example, as follows: In this embodiment, an argument passed to the function func2 to be implemented by H/W is the input data. Therefore, the input data names "data1" "data2" can be automatically extracted from the operation description, "int func2 (int *data1, int *data2)".

Although an argument passed to a function is an input data in this embodiment for simplification, the operation description is actually subjected to a syntax analysis in general. On the basis of the syntax analysis of the operation description, it may be determined which data is an input data, so as to extract the input data name.

Secondly, the output data name is extracted, for example, as follows: In this embodiment, a return value from the function func2 to be implemented by H/W to the function main is an output data. Therefore, the output data name "result" can be automatically extracted from the operation description, "return result".

Although a return value to a function is an output data in this embodiment for simplification, the operation description is actually subjected to the syntax analysis in general. On the basis of the syntax analysis of the operation description, it may be determined which data is an output data, so as to extract the output data name.

Thirdly, the transfer start address and the transfer end address are extracted as follows: As is shown in FIG. 35, the H/W implemented operation description includes:

```
"for (i=0; i=3;i++) {
    result+=(data1[i]+data2[i];
}
``` and hence, result=(data1[0]+data2 hw[0]+data1[1]+data2[1] data1[2]+data2[2]). Specifically, ith respect to the input data "data1" and "data2", data with indexes "0" through "2" are used in the operation. Accordingly, the transfer start address and the transfer end address of the input data are extracted as follows:

Transfer start addresses= indexes "0" of data1 and data2
Transfer end addresses=indexes "2" of data1 and data2

Specifically, the input data necessary for transfer are "data1 [0] through data1[2]" and "data2[0]" through data2[2]".

Furthermore, since the output data "result" is not an array in this embodiment, merely one word is transferred. Therefore, there is no need to extract the index of the output data.

Next, in the subsequent procedure, with respect to the input data, it is extracted from the operation description in the H/W local memory region information that the following data transfer are necessary:

data1[0] to [2] (processor)→data1 hw[0] to [2] (H/W)
data2[0] to [2] (processor)→data2 hw[0] to [2] (H/W)

Also, with respect to the output data, it is extracted that the following data transfer is necessary:

result (processor)→result hw (H/W)

In this embodiment, the data name of H/W (such as data1 hw, data2 hw and result hw) is automatically generated by adding "hw" to a data name extracted from the operation description.

The database stores information of "data names" and "addresses" as parameters as follows:

1. Syntax for defining a "data name": exter data type data name; etc.
2. Syntax for transferring "data name 1" to "data name 2" in a range between a "transfer start address" and a "transfer end address":

```
for (i= transfer start address; i<= transfer end
address; i++) {
    }, etc.
```

3. Others

Accordingly, in the procedure for generating the interface part S/W shown in FIG. 36, the information extracted as is shown in FIG. 35 are substituted for the parameters, thereby generating actual interface part S/W.

Figure 37:
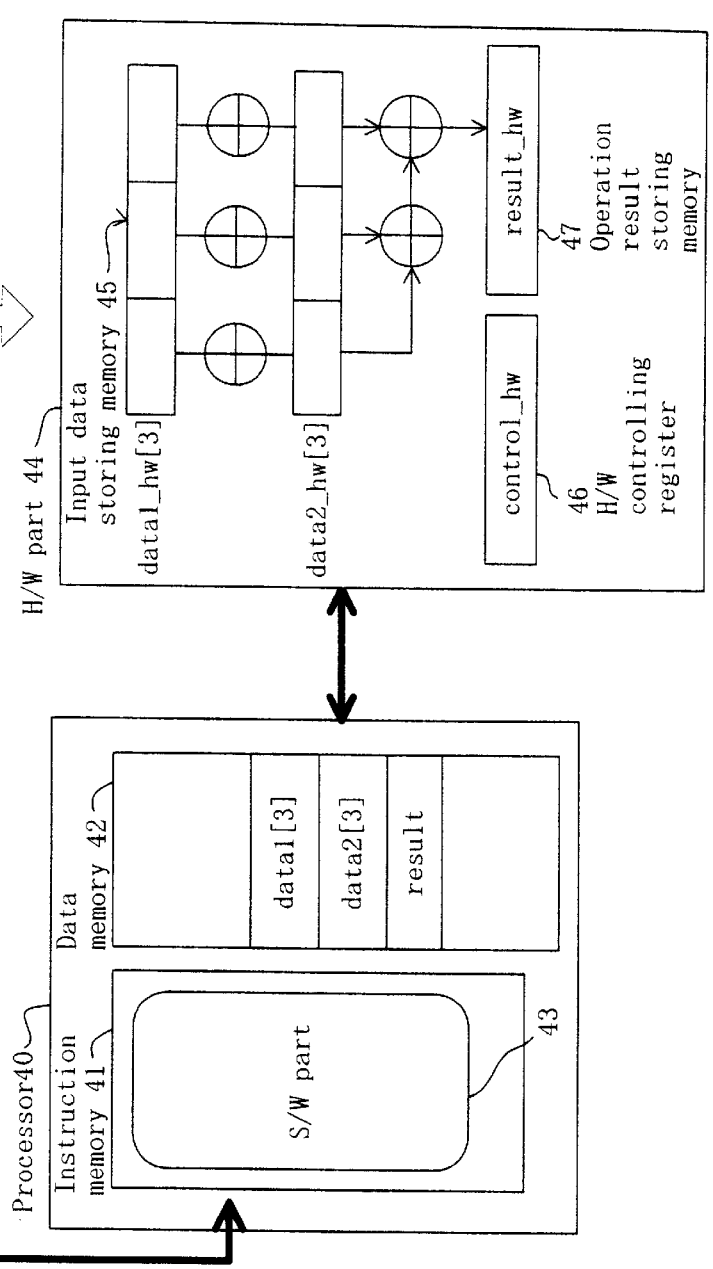
FIG. 37 is a block diagram for showing the structures of a processor and a hardware part generated in the first example of Embodiment 6.

FIG. 37 is a block diagram for showing the structures of a processor and a H/W part generated in this example. The processor 40 includes an instruction memory 41 and a data memory 42, and the instruction memory 41 includes a S/W part 43. The S/W part 43 stores the S/W implemented operation description including an interface between S/W and H/W. On the other hand, the H/W part 44 including an input data storing memory 45, a H/W controlling register 46 and an operation result storing memory 47 is generated by an operation synthesis tool or the like on the basis of the H/W implemented operation description.

In this example, an interface between S/W and H/W required in the S/W and H/W partitioning conducted in designing a system can be automatically generated. Accordingly, with the processing quantity (number of clock cycles) and power consumption reduced by the S/W and H/W partitioning, the design efficiency and the quality of the system (semiconductor integrated circuit device) to be designed can be improved.

SECOND EXAMPLE

Figure 38:
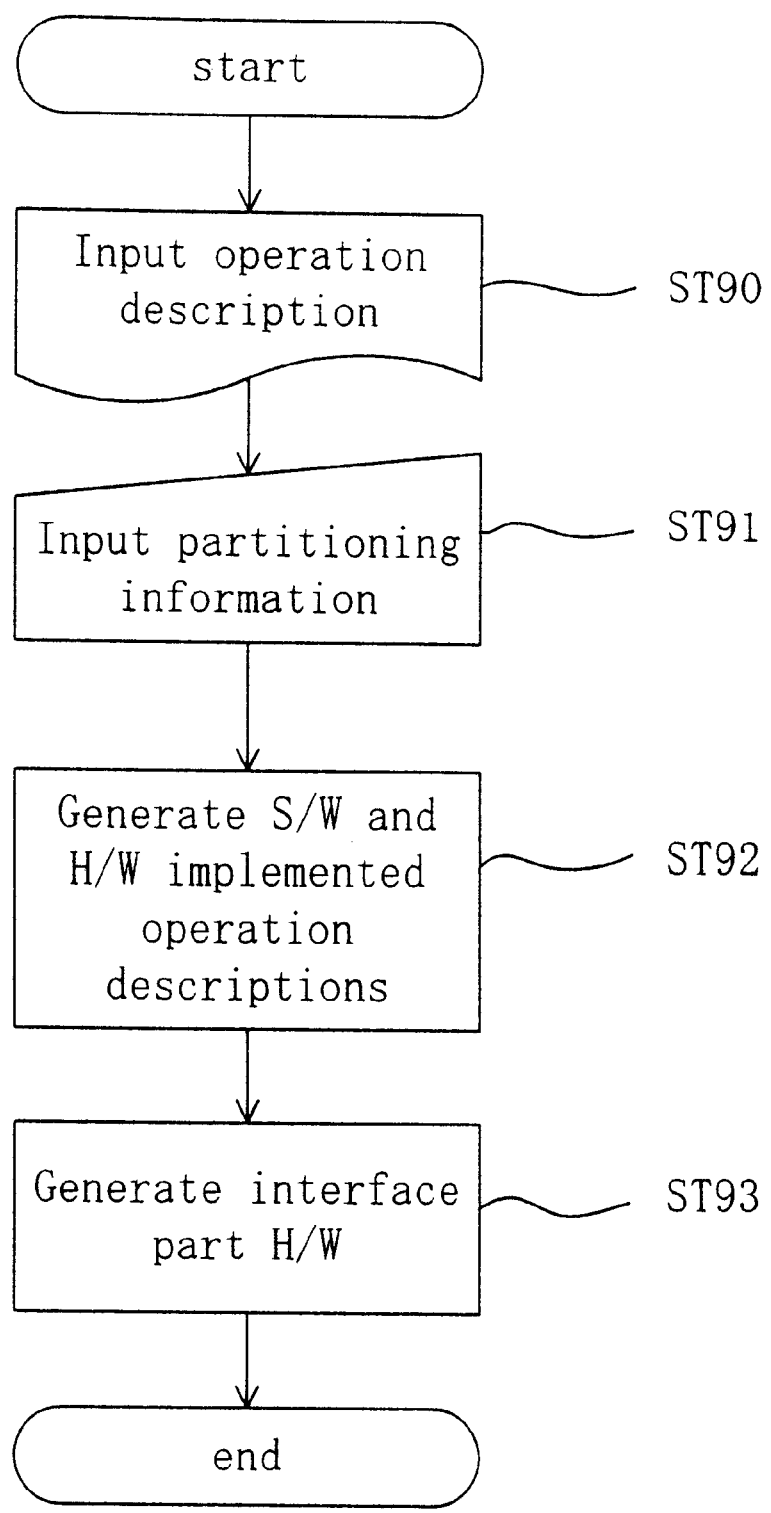
FIG. 38 is a flowchart for showing procedures in automatic generation of an interface between software and hardware in a second example of Embodiment 6.
Figure 39:
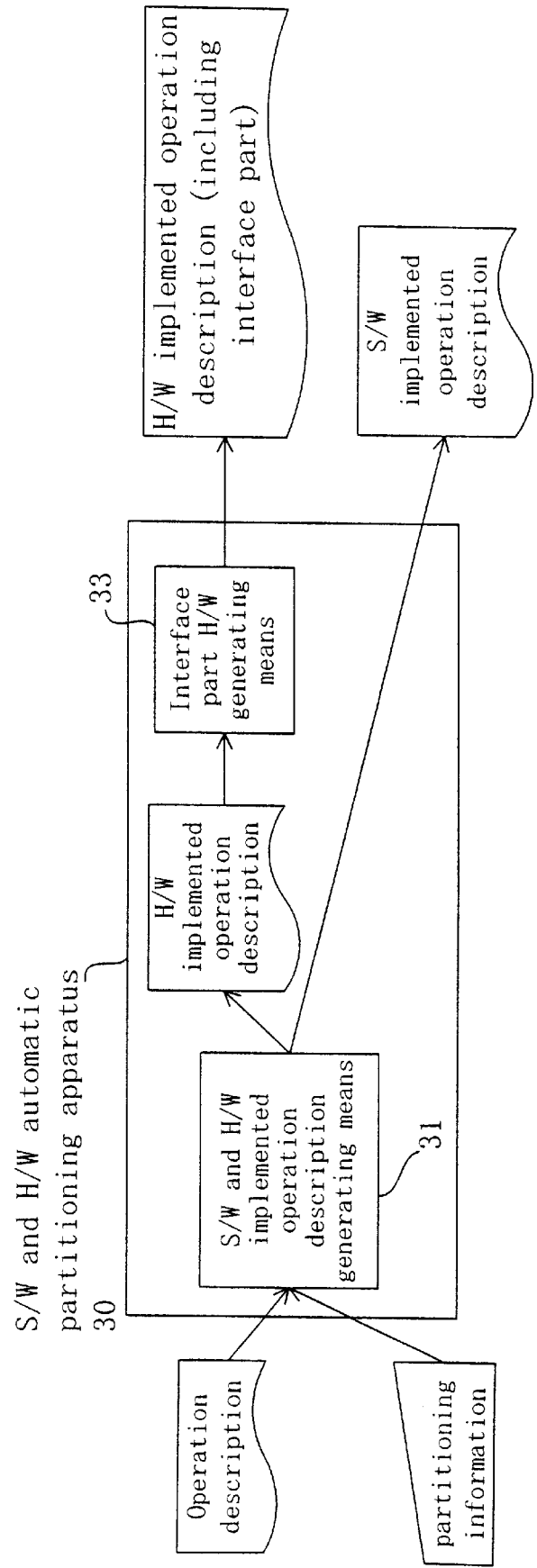
FIG. 39 is a block diagram for schematically showing the structure of a design apparatus of the second example of Embodiment 6.

In this example, a method of automatically generating an interface between S/W and H/W on the H/W side will be described. FIG. 38 is a flowchart for showing procedures in the automatic generation of an interface between S/W and H/W of this example. FIG. 39 is a block diagram for schematically showing the structure of a design apparatus of this example. FIGS. 40(a), 40(b), 41(a) through 41(d) and 42 through 44 are diagrams for showing examples of operation descriptions appearing in the respective procedures in the flow of FIG. 38.

As is shown in FIG. 39, a S/W and H/W automatic partitioning apparatus 30 of this example includes S/W and H/W implemented operation description generating means 31 and interface part H/W generating means 33. An operation description and partitioning information are input to the S/W and H/W implemented operation description generating means 31, so as to dividedly generate a H/W implemented operation description and a S/W implemented operation description. Furthermore, the H/W implemented operation description is input to the interface part H/W generating means 33, so as to generate a H/W implemented operation description including an interface part.

The input operation description and the partitioning information are basically the same as those input in the first example. However, in the ultimately generated H/W implemented operation description, input/output of data between a processor and a H/W part and interface part H/W for determining termination of a process by the H/W part are added.

Now, the procedures for automatically generating an interface of this example will be described with reference to FIGS. 40(a), 40(b), 41(a) through 41(d), and 42 through 44 in accordance with the flow of FIG. 38.

First, in step ST90, an operation description is input, and in step ST91, partitioning information is input. FIG. 40(a) is a diagram for showing an example of the operation description input in step ST90. Specifically, operations of functions main, func1 and func2 are described by the C language in the operation description. Also, FIG. 40(b) is a diagram for showing an example of the partitioning information input in step ST91. In the partitioning information of this example, the functions main and func1 are implemented by S/W and the function func2 is implemented by H/W.

Next, in step ST92, on the basis of the operation description and the partitioning information, a S/W implemented operation description and a H/W implemented operation description are dividedly generated. FIGS. 41(a) through 41(d) are diagrams for showing examples of the operation description, the partitioning information, the S/W implemented operation description and the H/W implemented operation description, respectively. Specifically, the functions main and func1 are described by the S/W implemented operation description and the function func2 is described by the H/W implemented operation description.

Then, in step ST93, interface part H/W is added to the H/W implemented operation description. FIG. 42 is a diagram for showing a procedure for adding an interface peripheral circuit operation description corresponding to the interface part H/W to the H/W implemented operation description generated in step ST92. The interface peripheral circuit operation description includes descriptions regarding processor memory access control, fetch of input data, output of an operation result, generation of interrupt, and the like. Examples of the operation of the interface peripheral circuit are control for inhibiting access to a data memory of a processor while a H/W part is making an access to the data memory for fetching input data or outputting an operation result, automatic fetch of input data in activating the H/W part, automatic output of the operation result in ending the operation of the H/W part, and generation of interrupt of the processor after outputting the operation result of the H/W part.

Figure 43:
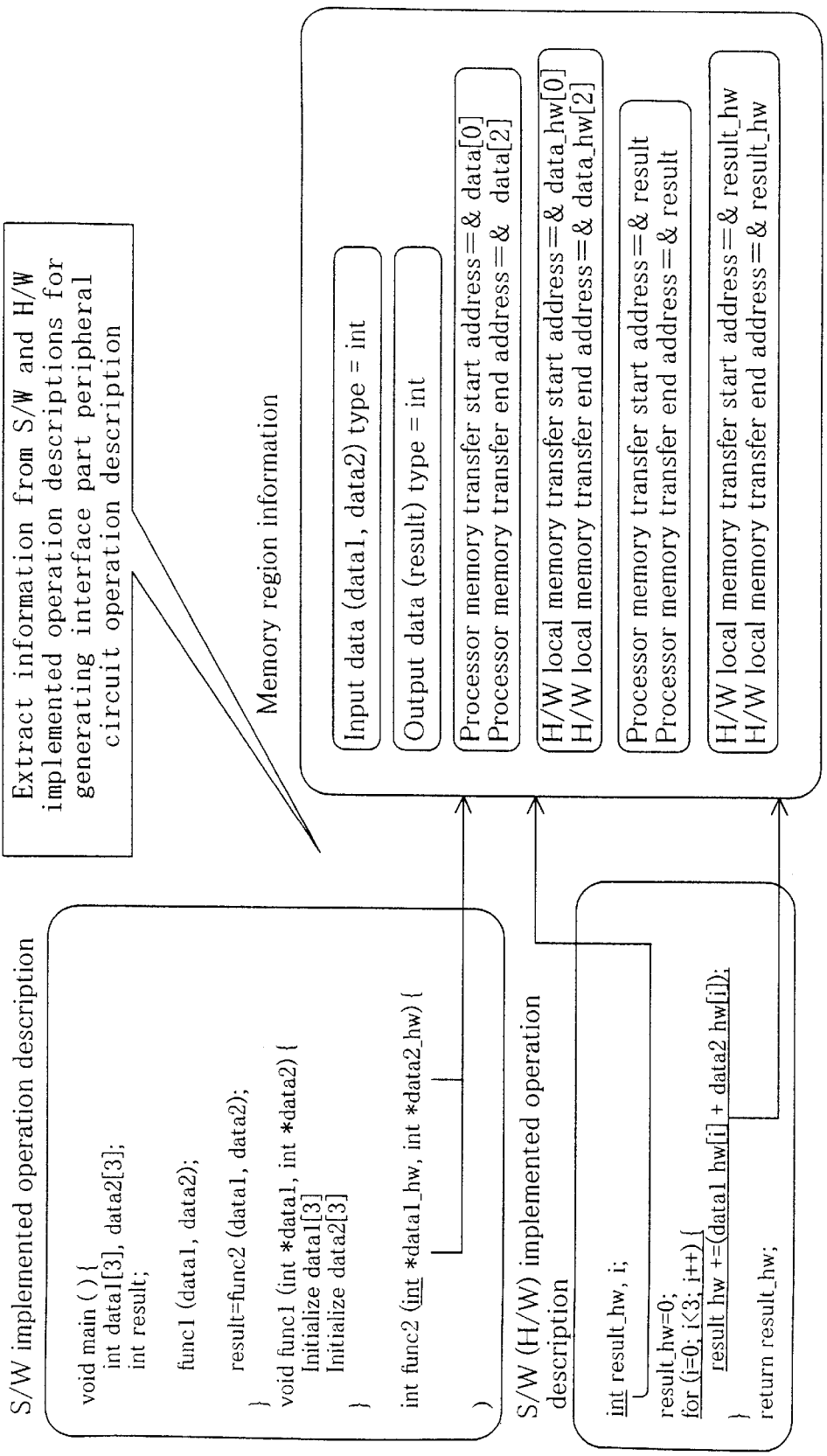
FIG. 43 is a diagram for illustrating procedures in automatic generation of memory region information in the design flow of the second example of Embodiment 6.

FIG. 43 is a diagram for illustrating procedures in automatically generating memory region information at this point. As is shown in FIG. 43, the memory region information is generated by using descriptions extracted from underlined portions of the S/W implemented operation description and the H/W implemented operation description generated in step ST92. Specifically, as the memory region information, input data (data1, data2), output data (result), a processor memory transfer start address "0" of the input data, a processor memory transfer end address "2" of the input data and the like are extracted. Then, a H/W local memory transfer start address "0" of the input data, a H/W local memory transfer end address "2" of the input data, a processor memory transfer start (end) address "result" of the output data and the like are generated. In this case, the information is extracted in basically the same manner as described with reference to FIG. 35, and hence, the description is omitted.

FIG. 44 is a diagram for illustrating a method of automatically generating the interface peripheral circuit operation description by using a database and the H/W local memory region information. The database stores memory read/write control circuit information regarding data transfer of the memory and sequence information regarding data transfer control between the processor and the local memory. The interface peripheral circuit operation description corresponding to the interface part H/W is automatically generated by using the database storing the information necessary for generating the interface peripheral circuit operation description and using the extracted memory region information.

The database stores information of transferred "data addresses" (such as s1, e1, s2 and e2) as parameters as follows:

1. Sequence information, for example, for transferring, when activated, data in addresses "s1" through "e1" of a processor memory to addresses "s1" through "e1" of a H/W local memory, activating the H/W and waiting for termination of the H/W, and transferring data in the addresses "s1" through "e1" of the H/W local memory to the addresses "s1" through "e1" of the processor memory;

2. Information of a memory read/write control circuit used in data transfer between the processor memory and the H/W local memory in the aforementioned sequence; and 3. Others Accordingly, in the procedure for generating the interface peripheral circuit operation description shown in FIG. 44, the information extracted as is shown in FIG. 43 are substituted for the parameters, so as to generate an actual interface peripheral circuit.

Figure 45:
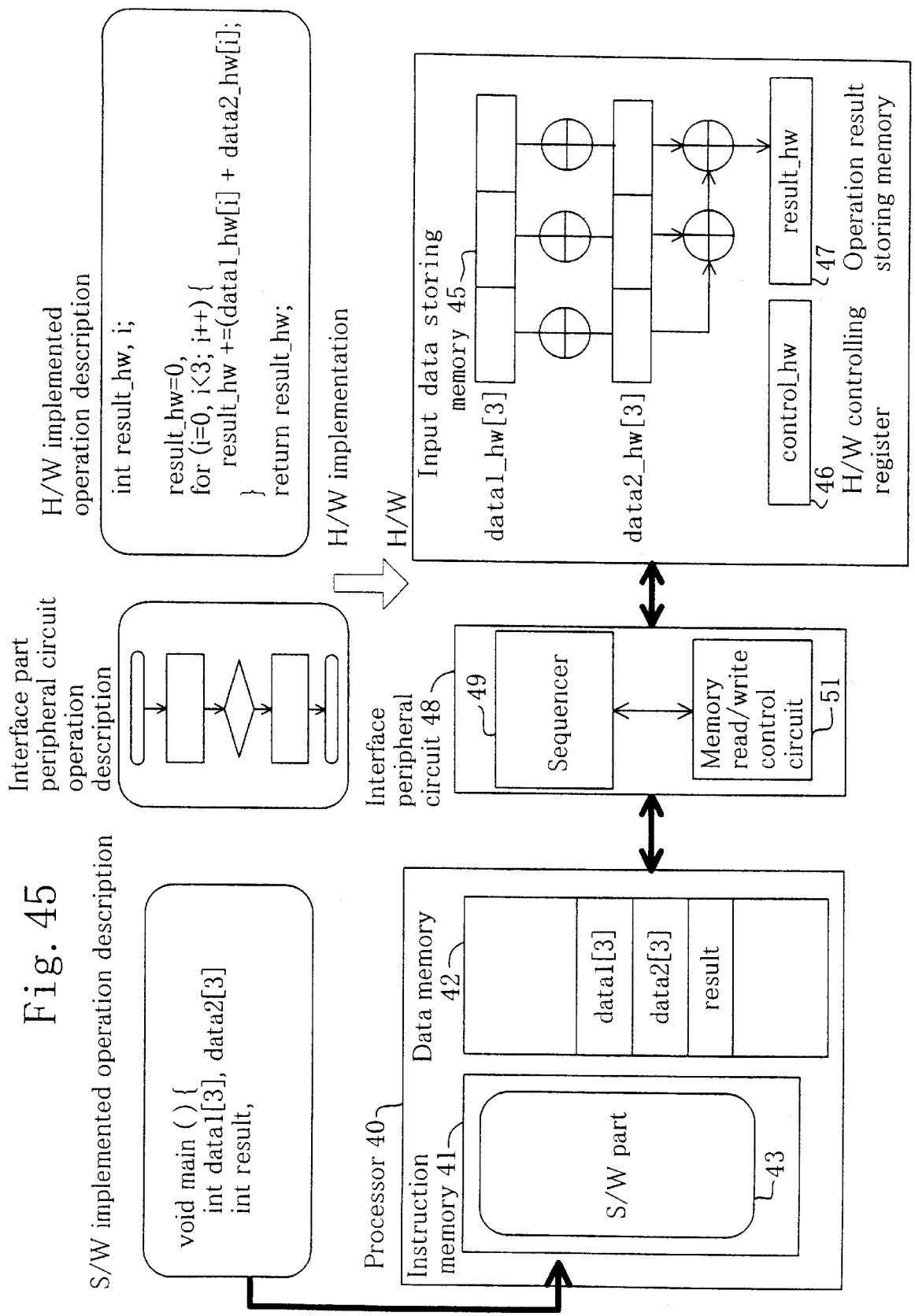
FIG. 45 is a block diagram for showing the structures of a processor and a hardware part generated in the second example of Embodiment 6.

FIG. 45 is a block diagram for showing the structures of a processor and a H/W part generated in this example. The processor 40 includes an instruction memory 41 and a data memory 42, and the instruction memory 41 includes a S/W part 43. The H/W part 44 includes an input data storing memory 45, a H/W controlling register 46 and an operation result storing memory 47. In addition, an interface peripheral circuit 48 is generated based on the interface peripheral circuit operation description, and the interface peripheral circuit 48 is disposed between the processor 40 and the H/W part 44. The interface peripheral circuit 48 includes a sequencer 49 and a memory read/write control circuit 50.

Also this example can exhibit the same effects as the first example. Specifically, since an interface between S/W and H/W can be automatically generated in the S/W and H/W partitioning, the design efficiency and the quality of a system (semiconductor integrated circuit device) to be designed can be improved.

The structure of the interface peripheral circuit is not limited to that described in this example. Also, the interface part H/W may be H/W other than the interface peripheral circuit.

What is claimed is:

1. A method of designing a semiconductor integrated circuit device comprising the steps of:
   (a) extracting description parts describing a loop processing part or a function by analyzing a system operation description language describing operations of the semiconductor integrated circuit device to be designed;
   (b) partitioning each of said description parts extracted from said system operation description language into a H/W implemented description when a processing quantity corresponding to a number of clock cycles of said description part exceeds a threshold value and into a S/W implemented description when the processing quantity is smaller than said threshold value;

(c) calculating a sum of the processing quantities of said description parts as a total processing quantity; and (d) determining whether or not said calculated total processing quantity meets a condition.

2. The method of designing a semiconductor integrated circuit device of claim 1, further comprising a step (e) of converting a description of one of said description parts and returning to the step (c) when said total processing quantity does not meet said condition in step (d), wherein the step (e) is repeatedly conducted until said total processing quantity meets said condition.

3. The method of designing a semiconductor integrated circuit device of claim 2, wherein, when said total processing quantity does not meet said condition after conducting the step (e) on all of said description parts, a procedure returns to the step (b) after easing said condition.

4. The method of designing a semiconductor integrated circuit device of claim 1, wherein said threshold value is given as a number of condition divergences appearing in said description part.

5. The method of designing a semiconductor integrated circuit device of claim 1, wherein said condition is a desired range or an upper limit of said total processing quantity.

6. The method of designing a semiconductor integrated circuit device of claim 1, wherein said total processing quantity is estimated on the basis of one of a source code analysis of said description part and simulation of said description part.

7. The method of designing a semiconductor integrated circuit device of claim 1, further comprising a step of obtaining total power consumption on the basis of all of said description parts partitioned between said H/W implemented description and said S/W implemented description, wherein, when said total power consumption does not meet a condition, a procedure returns to the step (c) after converting a description of one of said description parts.

8. A method of designing a semiconductor integrated circuit device comprising the steps of:

(a) obtaining power consumption of each function by analyzing functions included in a system operation description language describing operations of the semiconductor integrated circuit device to be designed;

(b) partitioning said function into a H/W implemented function when the power consumption of said function exceeds a threshold value and into a S/W implemented function when the power consumption is smaller than said threshold value;

(c) calculating a sum of the power consumption of all of said functions as total power consumption by estimating the power consumption of each function; and (d) determining whether or not said calculated total power consumption meets a condition.

9. The method of designing a semiconductor integrated circuit device of claim 8, wherein at least a use frequency of a general operation instruction in said function is analyzed in the step (c), and said threshold value is a value corresponding to an effect to reduce power consumption attained by H/W implementation of said function.

10. The method of designing a semiconductor integrated circuit device of claim 8, wherein at least an invoke frequency of said function is analyzed in the step (c), and said threshold value is a value obtained by partitioning a value corresponding to an effect to reduce power consumption attained by H/W implementation of said function by a smallest processing quantity among processing quantities of said functions.

11. The method of designing a semiconductor integrated circuit device of claim 8, wherein, when said total power consumption does not meet said condition in the step (d), the step (c) is repeatedly conducted after reducing said threshold value.

12. The method of designing a semiconductor integrated circuit device of claim 9, wherein probability of increase of an operation speed through H/W implementation is further analyzed in the step (c), and when throughput attained after increasing the operation speed is larger than throughput attained before increasing the operation speed, said function is implemented by H/W.

13. The method of designing a semiconductor integrated circuit device of claim 8, wherein power optimization is conducted in the step (c) by at least one of reduction of an operation frequency of each function, use of gated clock, reduction of a supply voltage and bus coding.

14. The method of designing a semiconductor integrated circuit device of claim 8, wherein said condition of the step (d) is that a value obtained by multiplying a processing quantity of said function attained through H/W implementation by power consumption of a unit process of a processor is larger than power consumption of said function attained through H/W implementation.

15. The method of designing a semiconductor integrated circuit device of claim 8, further comprising a step of obtaining a total processing quantity as a sum of processing quantities of all of said functions partitioned between the H/W implemented function and the S/W implemented function, wherein, when said total processing quantity does not meet a condition, a procedure returns to the step (b) after converting a description of one of said functions.

16. A method of designing a semiconductor integrated circuit device comprising the steps of:

(a) inputting a system operation description language describing operations of the semiconductor integrated circuit device to be designed and partitioning said system operation description language into respective elements;

(b) detecting plural elements including a common process flow by analyzing said respective elements;

(c) integrating said plural elements including the common process flow into a single element; and (d) partitioning said respective elements into a H/W implemented element and a S/W implemented element in accordance with characteristics thereof after the step (c).

17. The method of designing a semiconductor integrated circuit device of claim 16, further comprising, after the step (d), a step of determining whether or not said H/W implemented element and said S/W implemented element meet a condition, wherein, when a result of determination is negative, a procedure returns to the step (c) for changing integration of said elements.

18. A method of designing a semiconductor integrated circuit device comprising the steps of:

(a) inputting a system operation description language describing operations of the semiconductor integrated circuit device to be designed;

(b) inputting partitioning information including information used for S/W and H/W partitioning of respective operation descriptions of said system operation description language;

(c) partitioning said respective operation descriptions of said system operation description language between a H/W implemented operation description and a S/W implemented operation description on the basis of said partitioning information; and (d) automatically generating an interface between S/W and H/W.

19. The method of designing a semiconductor integrated circuit device of claim 18, further comprising, after the step (d), a step of adding said interface between S/W and H/W to said S/W implemented operation description.

20. The method of designing a semiconductor integrated circuit device of claim 19, wherein a database including information used for generating said interface between S/W and H/W is previously prepared, the method further includes a step of extracting a description regarding data input/output of H/W and a description regarding an operation of a processor from said S/W implemented operation description and said H/W implemented operation description partitioned in the step (c), and said interface between S/W and H/W generated in the step (d) includes a description regarding data input/output between the processor and the H/W and a description regarding determination of termination of a process of the H/W.

21. The method of designing a semiconductor integrated circuit device of claim 18, further comprising, after the step (d), a step of adding said interface between S/W and H/W to said H/W implemented operation description.

22. The method of designing a semiconductor integrated circuit device of claim 21, wherein a database including information used for generating said interface between S/W and H/W is previously prepared, the method further includes a step of extracting a description regarding data input/output of H/W and a description regarding an operation of a processor from said S/W implemented operation description and said H/W implemented operation description partitioned in the step (c), and an interface peripheral circuit operation description for operating H/W generated by said H/W implemented operation description is generated in the step (d).

* * * * *